(12) United States Patent
Lanphere et al.

(10) Patent No.: US 12,521,047 B2
(45) Date of Patent: Jan. 13, 2026

(54) IMPLANTABLE ACCESS CHAMBER AND ASSOCIATED METHODS OF USE

(71) Applicant: W.L. Gore & Associates, Inc., Newark, DE (US)

(72) Inventors: Janel Lanphere, Flagstaff, AZ (US); Allen Mackay, Flagstaff, AZ (US); Benjamin Trapp, Flagstaff, AZ (US); Michael Vonesh, Flagstaff, AZ (US)

(73) Assignee: W. L. Gore & Associates, Inc., Newark, DE (US)

( * ) Notice: Subject to any disclaimer, the term of this patent is extended or adjusted under 35 U.S.C. 154(b) by 368 days.

(21) Appl. No.: 16/968,286

(22) PCT Filed: Feb. 11, 2019

(86) PCT No.: PCT/US2019/017426
§ 371 (c)(1),
(2) Date: Aug. 7, 2020

(87) PCT Pub. No.: WO2019/157421
PCT Pub. Date: Aug. 15, 2019

(65) Prior Publication Data
US 2020/0367792 A1  Nov. 26, 2020

Related U.S. Application Data

(60) Provisional application No. 62/628,679, filed on Feb. 9, 2018.

(51) Int. Cl.
*A61B 5/1473* (2006.01)
*A61B 5/00* (2006.01)

(52) U.S. Cl.
CPC .......... *A61B 5/1473* (2013.01); *A61B 5/4839* (2013.01); *A61B 5/6861* (2013.01); *A61B 5/6865* (2013.01)

(58) Field of Classification Search
CPC ... A61B 5/1473; A61B 5/4839; A61B 5/6861; A61B 5/6865
See application file for complete search history.

(56) References Cited

U.S. PATENT DOCUMENTS

| | | |
|---|---|---|
| 3,953,566 A | 4/1976 | Gore |
| 4,187,390 A | 2/1980 | Gore |

(Continued)

FOREIGN PATENT DOCUMENTS

| | | |
|---|---|---|
| CN | 102650084 A | 8/2012 |
| DE | 3933373 A1 | 4/1991 |

(Continued)

OTHER PUBLICATIONS

Binding Theory, Equations for Affinity and Kinetics Analysis, Dynamic Biosensors, V01-2017, 6 pages.

(Continued)

*Primary Examiner* — Charles A Marmor, II
*Assistant Examiner* — Grace L Rozanski

(57) ABSTRACT

Sampling or removing interstitial fluid of a subject using an implantable access chamber and associated methods of use. An implantable access chamber can be configured to be inserted into tissue of a subject. The implantable access chamber can comprise a sensor arranged therein, wherein the sensor is configured to sense at least one analyte of interstitial fluid of the subject. The implantable access chamber can include a barrier portion defining a cavity. The barrier portion may be a material permeable to the interstitial fluid and occlusive to cells of the subject.

16 Claims, 15 Drawing Sheets

(56) References Cited

U.S. PATENT DOCUMENTS

| | | |
|---|---|---|
| 4,588,394 A | 5/1986 | Schulte et al. |
| 4,890,620 A | 1/1990 | Gough |
| 5,165,407 A | 11/1992 | Wilson et al. |
| 5,318,575 A | 6/1994 | Chesterfield et al. |
| 5,390,671 A | 2/1995 | Lord et al. |
| 5,391,250 A | 2/1995 | Cheney et al. |
| 5,476,589 A | 12/1995 | Bacino |
| 5,605,152 A | 2/1997 | Slate et al. |
| 5,607,477 A | 3/1997 | Schindler et al. |
| 5,651,767 A * | 7/1997 | Schulman .............. A61N 1/05 607/116 |
| 5,653,755 A | 8/1997 | Ledergerber |
| 5,843,069 A | 12/1998 | Butler et al. |
| 6,011,984 A | 1/2000 | Van Antwerp et al. |
| 6,330,464 B1 * | 12/2001 | Colvin, Jr. ......... G01N 21/7703 128/903 |
| 6,368,274 B1 | 4/2002 | Van Antwerp et al. |
| 6,579,498 B1 | 6/2003 | Eglise |
| 6,673,070 B2 | 1/2004 | Edwards et al. |
| 6,702,857 B2 | 3/2004 | Brauker et al. |
| 7,087,017 B2 | 8/2006 | Christopherson et al. |
| 7,091,033 B2 | 8/2006 | Farr et al. |
| 7,134,999 B2 | 11/2006 | Brauker et al. |
| 7,166,074 B2 | 1/2007 | Reghabi et al. |
| 7,471,972 B2 | 12/2008 | Rhodes et al. |
| 7,568,394 B1 | 8/2009 | Keilman et al. |
| 7,727,147 B1 * | 6/2010 | Osorio .............. A61M 5/14244 600/347 |
| 7,860,545 B2 | 12/2010 | Shults et al. |
| 7,985,263 B2 | 7/2011 | Berman et al. |
| 8,114,350 B1 | 2/2012 | Silver et al. |
| 8,292,808 B2 | 10/2012 | Miller et al. |
| 8,315,700 B2 | 11/2012 | Citron et al. |
| 8,527,026 B2 | 9/2013 | Shults et al. |
| 9,113,836 B2 | 8/2015 | Bernstein et al. |
| 9,486,560 B2 | 11/2016 | Buevich et al. |
| 2002/0091391 A1 | 7/2002 | Cole et al. |
| 2002/0183604 A1 | 12/2002 | Gowda et al. |
| 2003/0219714 A1 | 11/2003 | Farr et al. |
| 2003/0220552 A1 * | 11/2003 | Reghabi ............. A61B 5/14532 600/365 |
| 2004/0064133 A1 * | 4/2004 | Miller ................ A61M 5/1723 604/890.1 |
| 2004/0068276 A1 | 4/2004 | Golden et al. |
| 2005/0267543 A1 | 12/2005 | Heruth et al. |
| 2006/0016700 A1 | 1/2006 | Dexcom |
| 2006/0095079 A1 | 5/2006 | Gerber |
| 2007/0255235 A1 | 11/2007 | Olsen et al. |
| 2007/0255262 A1 | 11/2007 | Haase |
| 2008/0199507 A1 | 8/2008 | Skarja et al. |
| 2008/0281355 A1 | 11/2008 | Mayer et al. |
| 2009/0137899 A1 | 5/2009 | Bengtson |
| 2009/0196903 A1 * | 8/2009 | Kliman .................. A61P 27/02 424/423 |
| 2010/0191319 A1 * | 7/2010 | Lilburn .................... A61F 2/90 87/8 |
| 2010/0233021 A1 | 9/2010 | Sliwa et al. |
| 2011/0106249 A1 | 5/2011 | Becker |
| 2012/0035441 A1 | 2/2012 | Shoshihara et al. |
| 2012/0053687 A1 | 3/2012 | Migliazza et al. |
| 2012/0265034 A1 | 10/2012 | Wisniewski et al. |
| 2013/0144144 A1 * | 6/2013 | Laster ................... A61M 37/00 600/365 |
| 2013/0144356 A1 | 6/2013 | Horn et al. |
| 2013/0217983 A1 * | 8/2013 | Rebec .................. A61B 5/1459 600/316 |
| 2015/0157248 A1 | 6/2015 | Brauker et al. |
| 2015/0190620 A1 | 7/2015 | Dalton et al. |
| 2015/0320357 A1 | 11/2015 | Kuraguntla et al. |
| 2016/0005050 A1 | 1/2016 | Teman |
| 2016/0324443 A1 * | 11/2016 | Rowland ................ A61B 5/036 |
| 2016/0324449 A1 | 11/2016 | Gross et al. |
| 2017/0113028 A1 | 4/2017 | So et al. |
| 2017/0228627 A1 | 8/2017 | Geissler et al. |
| 2018/0116551 A1 * | 5/2018 | Newman ................ A61B 5/062 |
| 2018/0361118 A1 | 12/2018 | Cully et al. |
| 2019/0021636 A1 * | 1/2019 | Walter .................. B08B 7/0035 |
| 2019/0246957 A1 * | 8/2019 | Lucisano ........... A61B 5/14532 |

FOREIGN PATENT DOCUMENTS

| | | |
|---|---|---|
| EP | 2640452 A1 | 9/2013 |
| EP | 2938258 A1 | 11/2015 |
| JP | 04-227243 A | 8/1992 |
| JP | 2002-511281 A | 4/2002 |
| JP | 2006-525853 A | 11/2006 |
| JP | 2008-539842 A | 11/2008 |
| JP | 2012-515637 A | 7/2012 |
| JP | 2013-154002 | 8/2013 |
| JP | 2014-161650 A | 9/2014 |
| JP | 2015-119893 A | 7/2015 |
| WO | 01/50983 A1 | 7/2001 |
| WO | 2005/025634 A2 | 3/2005 |
| WO | 2008/079997 A2 | 7/2008 |
| WO | 2014/102743 A1 | 7/2014 |
| WO | 2017/210110 A1 | 12/2017 |
| WO | 2018/236900 A1 | 12/2018 |
| WO | 2019/157421 A1 | 8/2019 |

OTHER PUBLICATIONS

Clerico et al., "Clinical relevance of biological variation: the lesson of brain natriuretic peptide (BNP) and NT-proBNP assay," Clin. Chem. Lab. Med., vol. 44, No. 4, 2006, pp. 366-378.

Gerritsen, "Problems Associated With Subcutaneously Implanted Glucose Sensors," Diabetes Care, vol. 23, No. 2, Feb. 2000, pp. 143-145.

Gilligan et al., "Feasibility of Continuous Long-Term Glucose Monitoring from a Subcutaneous Glucose Sensor in Humans," Diabetes Technology & Therapeutics, vol. 6, No. 3, 2004, pp. 378-386.

International Search Report and Written Opinion received for PCT Patent Application No. PCT/US2019/017426, mailed on May 15, 2019, 14 pages.

Nathan et al., "The effect of intensive treatment of diabetes on the development and progression of long-term complications in insulin-dependent diabetes mellitus," N. Engl. J. Med., vol. 329, No. 14, Sep. 30, 1993, pp. 977-986.

Oliver et al., "Glucose sensors: a review of current and emerging technology," Diabet. Med., vol. 26, 2009, pp. 197-210.

Tran et al., "Proteomic Characterization of Dermal Interstitial Fluid Extracted Using a Novel Microneedle-Assisted Technique," Cleared for public release, distribution is unlimited, pp. S-1-S-18.

Valgimigli, "Overview of Commercially Successful Implantable Glucose Sensors," Key Features and Requirements for Performance, Safety and Reliability, SPIMD 2011—Lausanne—Apr. 1, 2011, 71 pages.

Vista Therapeutics Innovative NanoBioSensor Technology, Applying the Awesome Power of Small to Solve Biomedical Issues, Vista Therapeutics, Inc., 3900 Paseo def Sol, Santa Fe, NM 87507, 2 pages.

Yu et al., "Intrathoracic Impedance Monitoring in Patients With Heart Failure Correlation With Fluid Status and Feasibility of Early Warning Preceding Hospitalization," Circulation, vol. 112, 2005, pp. 841-848.

* cited by examiner

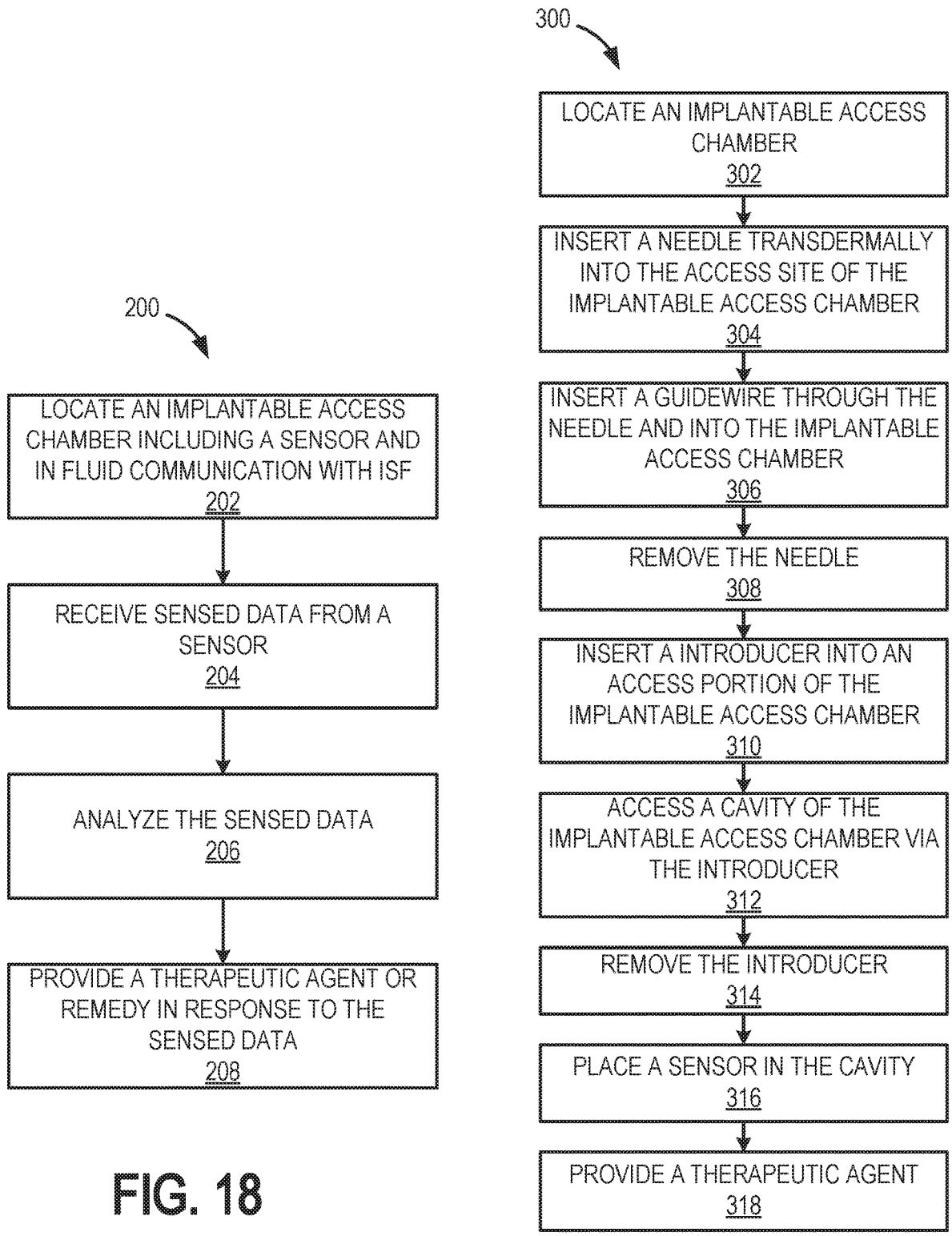

IMPLANTABLE ACCESS CHAMBER AND ASSOCIATED METHODS OF USE

CROSS-REFERENCE TO RELATED APPLICATION

This application is a national phase application of PCT Application No. PCT/US2019/017426, internationally filed on Feb. 11, 2019, claims the benefit of Provisional Application No. 62/628,679, filed Feb. 9, 2018, which is incorporated herein by reference in its entirety for all purposes.

FIELD

The present disclosure relates generally to implantable devices, and more specifically to implantable access chambers, such as a sensor encapsulation device, a sample reservoir, or a drug reservoir access chamber and associated methods of use.

BACKGROUND

Medical professionals have sampled analytes from interstitial fluid to determine a variety of health characteristics of a patient. Generally, medical professionals have obtained interstitial fluid using a syringe or other extraction method.

SUMMARY

The embodiments provided herein relate to sampling or removing interstitial fluid of a subject using an implantable access chamber and associated methods of use. Embodiments include, but are not limited to, the following examples.

In an Example 1, an implantable access chamber is configured to be inserted into tissue of a subject and for use with a sensor configured to sense at least one analyte of interstitial fluid of the subject, the implantable access chamber comprises: a barrier portion defining a cavity and being comprised of a material permeable to the interstitial fluid and occlusive to cells of the subject, the barrier portion being formed as a monolithic structure.

In an Example 2, an implantable access chamber is configured to be inserted into tissue of a subject and for use with a sensor configured to sense at least one analyte of interstitial fluid of the subject, the implantable access chamber comprises: a barrier portion defining a cavity and being comprised of a cohesive layer including a first layer and a second layer, the first layer being comprised of a material that is occlusive to cells of the subject, the second layer being comprised of a material permeable to the interstitial fluid, and the first layer being more cellular occlusive than the second layer.

In an Example 3, the method of treatment using the implantable access chamber of claim 1 or 2, comprises: locating the implantable access chamber implanted within the tissue, the implantable access chamber comprising a sensor being in fluid communication with the interstitial fluid; receiving, from the sensor, sensor data corresponding to at least one analyte of the interstitial fluid; and analyzing the sensor data to determine one or more characteristics of the subject based on the sensor data.

In an Example 4, the method of Example 3 further comprises providing a therapeutic agent to the subject in response to the analyzed sensor data.

In an Example 5, the method of Example 4 includes the therapeutic agent being provided internal to the implantable access chamber.

In an Example 6, the method of accessing the cavity of the implantable access chamber of Examples 1 or 2, comprises: locating the implantable access chamber implanted within the tissue, the implantable access chamber comprising a sensor being in fluid communication with the interstitial fluid; inserting a dilator into an access portion of the implantable access chamber to dilate the access portion; and accessing the cavity via the dilator.

In an Example 7, the method of Example 6, further comprises removing the sensor from the cavity via a lumen in the dilator.

In an Example 8, the method of Examples 6 or 7, further comprises inserting a sensor into the cavity via a lumen in the dilator.

In an Example 9, the method of Example 6 includes an introducer sheath surrounding the dilator and the method further comprises removing the dilator from inside the introducer sheath after the dilator accesses the cavity; and removing the sensor from the cavity through the introducer sheath.

In an Example 10, the method of Example 8 further comprises inserting a sensor into the cavity through the introducer sheath.

In an Example 11, the method of any one of Examples 6-10, further comprises providing a therapeutic agent into the cavity.

In an Example 12, the method of treatment using the implantable access chamber of Examples 1 or 2, comprises: locating the implantable access chamber implanted within the tissue; and providing a therapeutic agent internal to the implantable access chamber.

In an Example 13, the method of Example 12 includes the step of providing the therapeutic agent internal to the implantable access chamber to comprise inserting a dilator into an access portion of the implantable access chamber to dilate the access portion; and accessing the cavity via the dilator.

In an Example 14, the method of Example 13 includes an introducer sheath surrounding the dilator and the method further comprises: removing the dilator from inside the introducer sheath after the dilator accesses the cavity; and providing the therapeutic agent though the introducer sheath.

In an Example 15, the method of implanting the implantable access chamber of Examples 1 or 2 comprises: locating an implantation site; inserting a needle into the implantation site; inserting a guidewire through the needle; removing the needle; sliding a dilator over the guidewire and into the implantation site to dilate the implantation site, wherein an introducer sheath surrounds the dilator; removing the dilator from inside the introducer sheath; and providing the implantable access chamber into and through the introducer sheath to arrange the implantable access chamber at the implantation site.

In an Example 16, the method of implanting the implantable access chamber of Examples 1 or 2 comprises: locating an implantation site; incising the implantation site to fit a trocar, the trocar including the implantable access chamber; advancing the trocar into the incised implantation site; releasing the implantable access chamber from the trocar into the implantation site; and removing the trocar.

In an Example 17, the implantable access chamber of Examples 1 or 2, includes the implantable access chamber further comprising an access portion.

In an Example 18, the implantable access chamber of Example 2 includes the first layer being arranged as a first layer of the cohesive layer, wherein the first layer comprises an inner surface defining the cavity and an outer surface opposite the inner surface; and the second layer being arranged as a second layer, wherein the second layer comprises an outer surface configured to directly interact with the tissue and an inner surface opposite the outer surface, wherein the inner surface is arranged on the outer surface of the first layer.

In an Example 19, the implantable access chamber of Example 2 includes the first and second layers comprising: respective outer surfaces configured to directly interact with the tissue; respective inner surfaces opposite the outer surfaces, wherein the inner surfaces collectively define the cavity; and respective side surfaces, wherein the side surface of the first layer contacts and is arranged adjacent to the side surface of the second layer.

In an Example 20, the implantable access chamber of any one of Examples 1-19 includes the barrier portion comprising a sampling site for sampling the interstitial fluid contained therein.

In an Example 21, the implantable access chamber of Example 20 includes the cavity being transdermally accessible via the sampling site.

In an Example 22, the implantable access chamber of Examples 20 or 21 includes the cavity being accessible via the sampling site using electromagnetic energy.

In an Example 23, the implantable access chamber of any one of Examples 20-22 includes the cavity being accessible via the sampling site using a microneedle.

In an Example 24, the implantable access chamber of any one of Examples 20-23 includes the implantable access chamber further comprising a sampling reservoir arranged within the cavity and accessible via the sampling site, the sampling reservoir being configured to be in fluid communication with interstitial fluid that permeates the barrier portion.

In an Example 25, the implantable access chamber of Example 24 includes the barrier portion being more occlusive than walls of the sampling reservoir.

In an Example 26, the implantable access chamber of any one of Examples 1-25 includes a sensor arranged at least partially within the cavity.

In an Example 27, the implantable access chamber of Example 26 includes the cavity completely encapsulating the sensor.

In an Example 28, the implantable access chamber of Examples 26 or 27 includes the implantable access chamber further comprising a lead terminating in the cavity and exiting the cavity via an access portion of the implantable access chamber, the lead being configured to couple the sensor to another device.

In an Example 29, the implantable access chamber of any one of Examples 26-28 includes the sensor being printed on a surface of the cavity.

In an Example 30, the implantable access chamber of any one of Examples 1-29 includes the implantable access chamber further comprising a stabilizing flange extending from the barrier portion, the stabilizing flange being comprised of a material configured to encourage greater tissue ingrowth into the stabilizing flange than at least a portion of the barrier portion.

In an Example 31, the implantable access chamber of any one of Examples 1-30 includes at least a portion of the implantable access chamber being comprised of a ferromagnetic material.

In an Example 32, the implantable access chamber of any one of Examples 1-31 includes the barrier portion being comprised of a material occlusive to molecules that exceed a threshold molecular weight.

In an Example 33, the implantable access chamber of any one of Examples 1-32 includes the implantable access chamber further comprises an access portion, wherein the access portion comprises an annulus forming an aperture and a self-sealing member within the aperture.

In an Example 34, the implantable access chamber of any one of Examples 17-33, wherein at least a portion of one or more selected from the group of the barrier portion and the access portion are comprised of a biocompatible polymer.

In an Example 35, the implantable access chamber of Example 34, wherein the biocompatible polymer is ePTFE.

In an Example 36, the implantable access chamber of any one of Examples 17-35, wherein an average pore size of the access portion is less than about 0.5 microns.

In an Example 37, the implantable access chamber of any one of Examples 1-36, the implantable access chamber further comprising a photo-luminescent receptor arranged in the cavity.

In an Example 38, the implantable access chamber of any one of Examples 1-37, the implantable access chamber further comprising a coating arranged on an outer surface of the barrier portion, wherein the coating is configured to reduce biochemical accumulation on the outer surface of the barrier portion.

In an Example 39, the implantable access chamber of Example 38, wherein the coating is at least one of: solid polyurethane coating and CBAS™.

In an Example 40, the implantable access chamber of any one of Examples 1-39, the implantable access chamber further comprising an active therapeutic agent.

In an Example 41, the implantable access chamber of Example 40, the active therapeutic agent comprising at least one of: dexamethasone and vascular endothelial growth factor.

In an Example 42, the implantable access chamber of any one of Examples 1-41, wherein at least a portion of the barrier portion is comprised of a flexible material.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 18 is a flow diagram of a method of treatment using an implantable access chamber according to an embodiment of the present disclosure;

FIG. 19 is a flow diagram of a method of accessing a cavity of an implantable access chamber according to an embodiment of the present disclosure.

Figure 1:
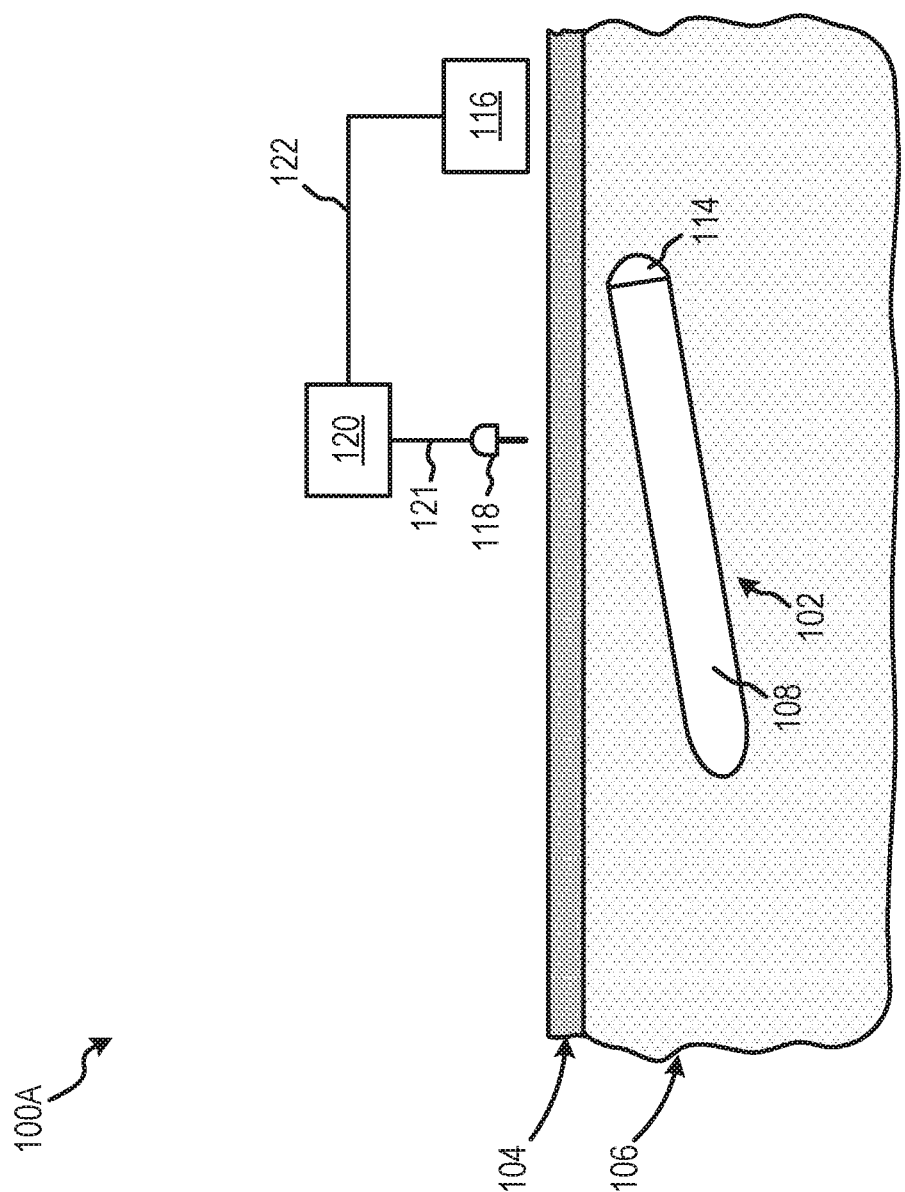
FIG. 1 is a side view of a system including an implantable access chamber according to an embodiment of the present disclosure.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Upon implantation of a foreign body into a host tissue, the foreign body will typically elicit a reaction from the host tissue that includes inflammation, followed by a cellular encapsulation. A goal of the outermost layer of an implantable device (e.g., diagnostic or therapeutic device) is to minimize this foreign body response. For an implantable device where communication with representative interstitial fluid without significant lag time is preferred, a benign foreign body response and the promotion of capillary growth in near proximity to the device is recommended. Even for an implantable device that has a well-designed outer (bio-interface) layer, this reaction and healing process may take time. As an example, an implantable sensor could require 3 to 6 weeks before a reliable reading of the interstitial fluid can be realized. During this healing time, the implantable sensor is often not functioning as intended. For a device that needs to be replaced on a regular basis due to, e.g., battery life, enzyme life, therapeutic capacity, fouling, etc., this frequent downtime is not acceptable to the patient relying on the function.

The embodiments disclosed herein provide a solution to the "downtime" associated with the necessary healing associated with replacing a device. In particular, the embodiments provided herein disclose an implantable access chamber that can be decoupled from a device insertable therein (e.g., a sensor) allowing the insertable device to be removed and the bio-interface of the tissue access chamber to remain intact with the surrounding tissue. A new insertable device (e.g., new sensor) could then be placed into the already mature tissue access chamber. This would reduce the need for a substantial new "healing" event upon device replacement and minimize the associated downtime.

FIG. 1 is a side view of a system 100A including the implantable access chamber 102. In at least one embodiment, the implantable access chamber 102 may be used to facilitate sampling of one or more analytes included in interstitial fluid of a subject. To do so, the implantable access chamber 102 may be implanted under the surface of a subject's skin 104. For example, the implantable access chamber 102 may be implanted in the subject's subcutaneous tissue 106. Additionally or alternatively, the implantable access chamber 102 may be implanted in other types of tissue, such as muscle, lymph, organ tissue, veins, ophthalmic, arteries or the like, and used in animal tissue.

In at least one embodiment, the implantable access chamber 102 may remain implanted in the subject for 1 year or more. However, the duration in which the implantable access chamber 102 is implanted in the subject may depend on the composition of the implantable access chamber 102, the type of tissue 106 in which the implantable access chamber 102 is implanted, and/or the function performed by the implantable access chamber 102. While the implantable access chamber 102 is implanted, the implantable access chamber 102 may be repeatedly re-accessed, as discussed in more detail below. This allows the implantable access chamber 102 to offer many benefits.

The size of the implantable access chamber 102 may also vary depending on the function of the implantable access chamber 102 and/or the type of subcutaneous tissue 106 in which the implantable access chamber 102 is implanted. As an example, the length of the implantable access chamber 102 may range between 5 mm to 50 mm. As another example, the height and/or thickness of the implantable access chamber 102 may range between 2 mm-20 mm. However, these are only examples and not meant to be limiting, as it is understood that small dimensions may be preferred.

Once implanted in subcutaneous tissue 106, a barrier portion 108 of the implantable access chamber 102 contacts interstitial fluid of the subject. In at least one embodiment, the barrier portion 108 defines a cavity 110 (depicted in FIGS. 5 and 6). At least some portions of the barrier portion 108 are comprised of a material that is permeable to interstitial fluid. Because at least some portions of the barrier portion 108 are permeable to interstitial fluid, the interstitial fluid permeates the barrier portion 108 and progresses into the cavity 110. In addition, at least some portions of the barrier portion 108 are wholly or partially cellular (e.g., red blood cells, macrophages, etc.) occlusive. In at least one example, cells may grow partially into the barrier portion 108 and in at least one other example, cellular ingrowth into the barrier portion 108 may be substantially restricted.

To be permeable to interstitial fluid and/or to be wholly or partially cellular occlusive, the barrier portion 108 may be comprised of one or more different materials. For example, the barrier portion 108 may be comprised of an expanded polytetrafluoroethylene (ePTFE). For ePTFE, or similar microporous material, such as expanded polyethylene (ePE), electrospun biopolymers, or various microporous hydrogels, permeability may be determined by the pore size of the barrier portion 108. It is also appreciated that the barrier portion 108 may be constructed from bio-absorbable materials, such as poly-lactic acid (PLA), poly-glycolic acid (PGA), PGA-TMC, etc. This configuration would allow host reabsorption after the function of the sub Q access chamber. In ePTFE, pore size relates to the fibril length of the material. Pore size may be measured by internodal distance or fibril length. Additionally or alternatively, fibril length is measured as described in U.S. Pat. No. 4,482,516, issued to Gore, which is incorporated herein by reference in its entirety. The fibril length of ePTFE in a single direction may be defined as the average of ten measurements between nodes connected by fibrils in the direction of stretching. Ten measurements are made in the following manner. First, a photomicrograph is made of a representative portion of the sample surface, of adequate magnification to show at least five sequential fibrils within the length of the photomicrograph. Two parallel lines are drawn across the length of the photomicrograph to divide the photograph into three equal areas, with the lines being drawn in the direction of stretching and parallel to the direction of orientation of the fibrils. Measuring from left to right, five measurements of fibril length are made along the top line in the photograph beginning with the first node to intersect the line near the left edge of the photograph and continuing with consecutive nodes intersecting the line. Five more measurements are made along the other line from right to left beginning with the first node to intersect the line on the right hand side of the photograph. The ten measurements obtained by this method are averaged to obtain the fibril length of the material.

For ePTFE that has been stretched or expanded in more than one direction, the fibril length is estimated by examining a representative photomicrograph of the material surface and comparing fibril lengths as described above in a manner that represents the various directional orientations of the fibrils.

Thicker fibrillated materials generally have more tortuous pathways connecting one end of a pore to the other end of the pore. As a result, a thicker fibrillated material may have pores that are larger than the entity sought to be excluded by the pores, but will remain resistant to passage of the entity through the pores due to the increased tortuosity of the pathways of the pores in the thicker material. In at least one embodiment, the fibril length and the thickness of an ePTFE material is chosen to form pores that resist cellular ingrowth across the entire thickness of the barrier portion 108 beyond a desired point, while being selectively permeable to molecules less than a threshold molecular weight. Additionally or alternatively, the fibril length and the thickness of an ePTFE material of the barrier portion 108 is chosen to form pores that resist cellular ingrowth entirely, while being selectively permeable to molecules less than a threshold molecular weight. In one example, the threshold molecular weight may be 250 kilodaltons (kDa). In another example, the threshold molecular weight may be 200 kDa. In even another example, the threshold molecular weight may be 100 kDa. In even another example, the threshold molecular weight may be 50 kDa. In even another example, the threshold molecular weight may be 25 kDa.

In at least some embodiments, a coating may be applied to the barrier portion 108. The coating may reduce biochemical accumulation on an outer surface of the barrier portion 108 or other desirable objectives. An example coating that can be used is a solid polyurethane coating partially imbibed inside the barrier portion's cross section. The urethane would be cell impermeable, but permeable to components in the interstitial fluid through a diffusion mechanism. For a glucose sensor, the layer including the solid polyurethane coating may be referred to as a "resistance" layer because it allows rapid transport of oxygen, but purposefully slows the passage of glucose. As a result, a non-oxygen starved reaction occurs at the glucose sensor. As another example, CBAS™ may be used as a coating. Similarly, the coating may contain one or more bioactive agents intended to influence inflammation (e.g., dexamethasone) or cellular response (e.g., vascular endothelial growth factor (VEGF)).

Additional details regarding the construction and composition of the barrier portion 108 are described in relation to FIGS. 7-9 below.

Figure 5:
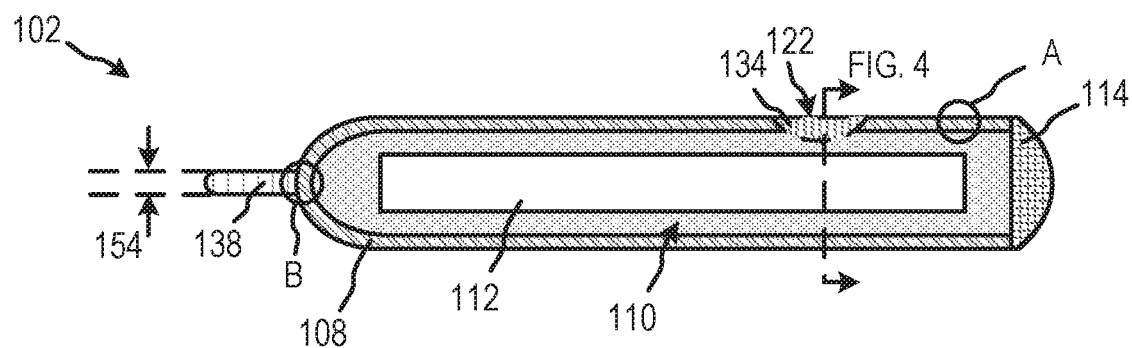
FIG. 5 is a side cross-sectional view of the implantable access chamber depicted in FIGS. 3-4.
Figure 6:
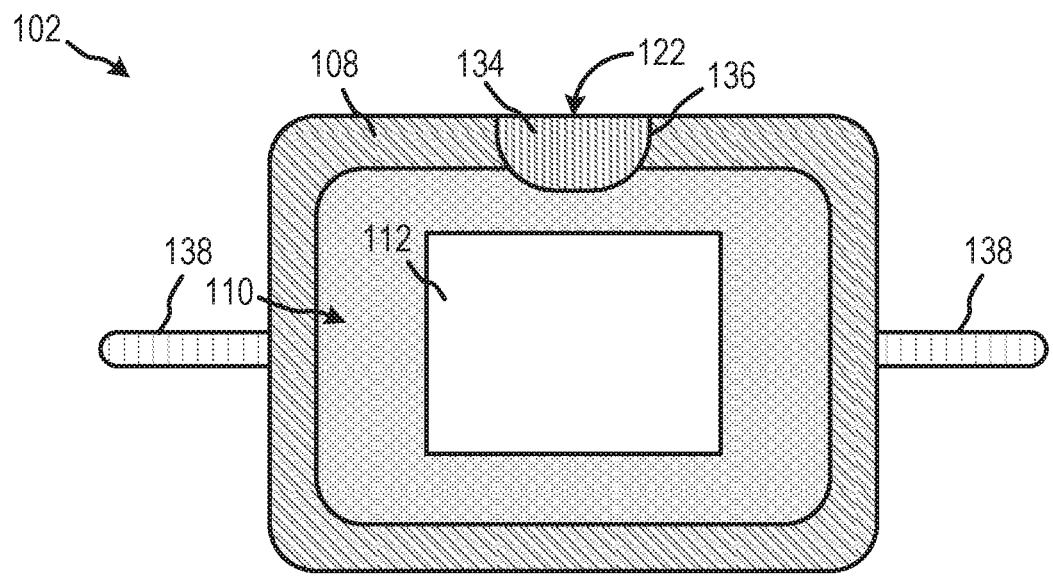
FIG. 6 is a front cross-sectional view of the implantable access chamber depicted in FIGS. 3-5.

As stated above and shown in FIGS. 5-6, the barrier portion 108 defines a cavity 110. In some embodiments, a stent, or core (not shown) may be included in the cavity 110 to add structural integrity to the cavity 110. The stent can be in any shape and made of any biocompatible material suitable for keeping all or part of the cavity 110 in an opened, or expanded form during storage and/or following implantation of the implantable access chamber 102. Suitable materials for a stent include, but are not limited to, stainless steel, titanium, and various hydrogels. To maintain the entire length of the cavity 110 in an expanded configuration, an inert core simulating the shape and resilience of the cavity 110 may be placed within the cavity 110. In at least one embodiment, the preferred material for such an inert core is HYPAN®. Structural Hydrogel. (Hymedix International, Inc., Dayton, N.J.)

In at least one embodiment, the cavity 110 houses a sensor 112 (shown in FIGS. 5-6). In some embodiments, the sensor 112 is arranged completely within the cavity 110 and in other embodiments, the sensor 112 is only arranged partially within the cavity 110. Additionally or alternatively, the sensor 112 may be printed or otherwise deposited or formed on a surface of the cavity 110. The sensor 112 is configured to sense analytes of interstitial fluid that permeated the barrier portion 108. Alternatively, it is also understood that the sensor 112 may sense bioelectrical activity. In exemplary embodiments, the sensor 112 senses analytes indicative of body characteristics on a continuous, intermittent or near continuous basis. The analytes the sensor 112 may sense include, but are not limited to, glucose, potassium, inorganic phosphorous, magnesium, lactate dehydrogenase (LD), lactate, oxygen, insulin, C-peptide, parathyroid hormone (PTH), osteocalcin, C-telopeptide, brain natriuretic peptide (BNP), adrenocorticotropic hormone (ACTH), other types of hormones, pharmacologic agents, bio-pharmaceuticals, proteins and peptides, biomarkers, antibodies, therapeutic agents, electrolytes, vitamins, pathogenic components, antigens, molecular markers associated with different disease conditions in stages, viral loads, and/or the like.

The sensor 112 may be an electrochemical sensor that uses enzymatic and/or optical properties to determine analyte concentrations in the interstitial fluid. For example, glucose levels may be determined by the sensor 112 using electrodes and glucose oxidase. Examples of electrochemical sensors are described in U.S. Pat. No. 5,391,250 to Cheney, II et al., U.S. Pat. No. 5,390,671 to Lord et al., U.S. Pat. No. 5,165,407 to Wilson et al., and U.S. Pat. No. 4,890,620, to Gough, which are incorporated herein by reference in their entireties. Additionally or alternatively the sensor 112 may utilize optical properties such as shown and described in U.S. Pat. No. 5,605,152 to Lord et al., or fiber optic structures and/or optical/fluorescent compounds such as shown and described in U.S. Pat. No. 6,011,984 to Van Antwerp et al., all of which are incorporated herein by reference in their entireties.

The sensor 112 may also be a nanosensor. In some embodiments, the nanosensor may be configured to use one or more of the following detection and identification methods disclosed in U.S. Pat. No. 7,091,033 to Farr et. al. and U.S. Pub. No. 2003/0219714 to Farr et al., which are incorporated herein by reference in their entireties. Further, the sensor 112 may be biological in nature, for example comprising cells that are responsive to the local environment.

The cavity 110 may be of various sizes and/or shapes to accommodate the size and/or shape of the sensor 112. In at least some embodiments, the size of the cavity 110 may be configured so interstitial fluid in the cavity 110 does not become stagnant once inside the cavity 110. That is, the size of the cavity 110 may facilitate housing the sensor 112 and contain limited space around the sensor 112 so that any interstitial fluid that comes into contact with the sensor 112 has been exchanged frequently enough to facilitate current analyte concentration readings of interstitial fluid of the subject. For example, the distance between walls of the cavity 110 and the exterior portions of the sensor 112 may range between 0.5-50.0 microns. Alternatively, there may be direct contact between the sensor 112 and walls of the cavity 110.

Additionally or alternatively to including a sensor 112, the cavity 110 may contain a drug delivery device and/or therapeutic agent. In at least one embodiment, the barrier portion 108 permits exchange of therapeutic agents from the cavity 110, across the barrier portion 108, and into subcutaneous tissue 106 of the subject. Exemplary therapeutic agents include, but are not limited to, insulin, erythropoletin, G-CSF, trastuzumab, panitumumab, gemtuzumab ozogamicin, rituximab, omalizumab, infliximab, dexamethasone, VEGF, chemotherapeutic agents, glucose, anti-proliferative agents, anti-restinotics, pain medications, anti-inflammatories, drugs that require accurate metering (e.g., drugs to treat Alzheimer's disease, Parkinson's disease and/or the like), angiotensin converting enzyme inhibitors, anti-biotics, anti-convulsants, anti-diabetics, benzodiazebines, beta blockers, calcium channel blockers, diuretics, HMG-CoA reductase inhibitors, NSAID, opioid, proton pump inhibitors, selective serotonin re-uptake inhibitors, and/or the like.

In at least one embodiment, the sensor 112, drug delivery device and/or therapeutic agent may be placed into the cavity 110 and/or removed from the cavity 110 via an access portion 114 secured to the barrier portion 108. In some embodiments, the access portion 114 is arranged on one side of the implantable access chamber 102 (as illustrated) and in other embodiments the access portion 114 is arranged on both sides of the implantable access chamber 102. The access portion 114 can have any shape suitable for facilitating placement, retrieval, and replacement of a sensor 112 or therapeutic agent in the cavity 110.

In at least one embodiment, the access portion 114 is a port that can be repeatedly opened and closed with a sealing mechanism (examples depicted in FIGS. 11-14). Sealing mechanisms include, but are not limited to, caps, plugs, fittings, clamps, compression rings, or valves, for example. Examples of closeable openings include, but are not limited to, a resealable port, or housing. The sealing mechanism may be attached to the access portion 114 with friction, by clamping, or with screw means comprised of threads and grooves, for example. Commercially available fittings, such as Luer-lok connectors (value Plastics, Inc., Fort Collins, Colo.), can also be used as the access portion 114.

In at least one embodiment, the access portion 114 is sealed with a sealing mechanism to create a hermetical seal, a fluid-tight seal, or a non-fluid-tight seal. An apparatus intended for permanent or long-term (i.e. at least about three weeks) implantation in a subject, is preferably sealed with a hermetical or a fluid-tight seal. For example, the access portion 114 may be attached to the barrier portion 108 with a strong, biocompatible adhesive, such as the thermoplastic fluorinated ethylene propylene (FEP) or epoxy. Embodiments describing attached the access portion 114 to the barrier portion 108 using FEP are disclosed in U.S. Pat. No. 5,843,069 issued to Gore, which is incorporated herein by reference in its entirety.

Alternatively, the access portion 114 may be fabricated by injection molding of a fitting onto the end of the barrier portion 108 using techniques known to those skilled in the art, such as insert molding. Insert injection molding of the access portion 114 on the end of the barrier portion 108 includes first placing a cylindrical piece of tooling into the cavity 110 followed by placement of the cavity 110 and the cylindrical tool into a mold cavity. The mold cavity is then filled with a polymeric substance comprised of a thermosetting resin such as polydimethylsiloxane, for example, or with a molten thermoplastic such as fluorinated ethylene propylene (FEP), epoxy, polycarbonate, polyester, or polysulfone, either alone or in combination, for example. Following curing of the polymeric resin through appropriate reaction conditions or through cooling as required, the mold cavity is opened and the cylindrical mold insert removed from the lumen of the tube.

The access portion 114 may also be a hole in the microporous polymeric material with one or more flexible pieces, or flaps, of polymeric material positioned to cover and close the hole. The flaps may be formed as part of the apparatus or may be attached to the apparatus subsequent to its initial construction.

Figure 15:
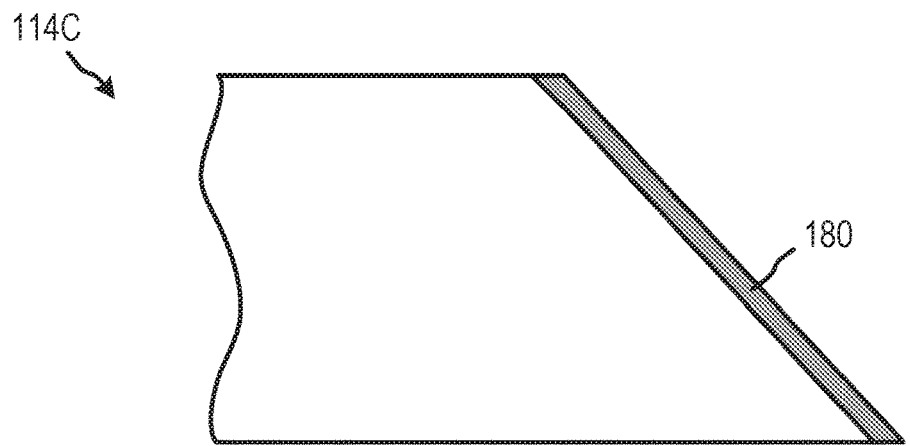
FIG. 15 is an enlarged side view of the access portion of the implantable access chamber according to even another embodiment of the present disclosure.
Figure 16:
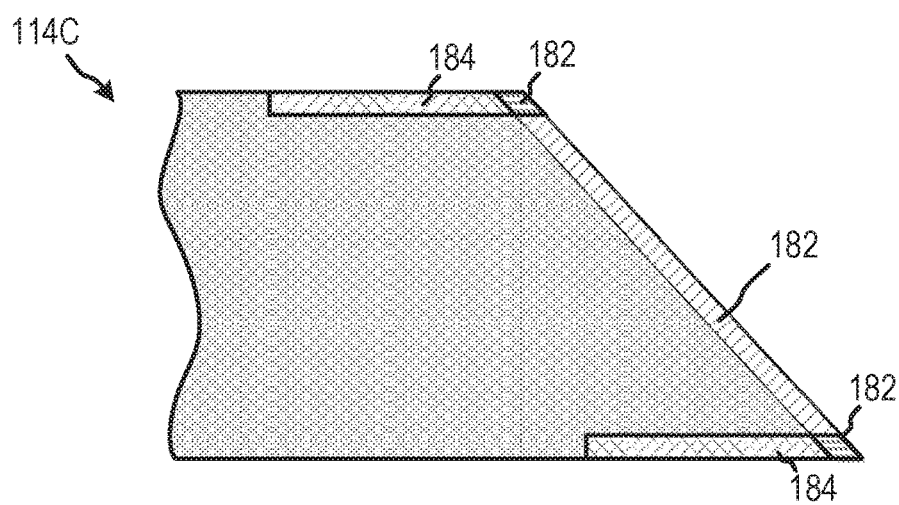
FIG. 16 is a cross section of the access portion depicted in FIG. 15.
Figure 17:
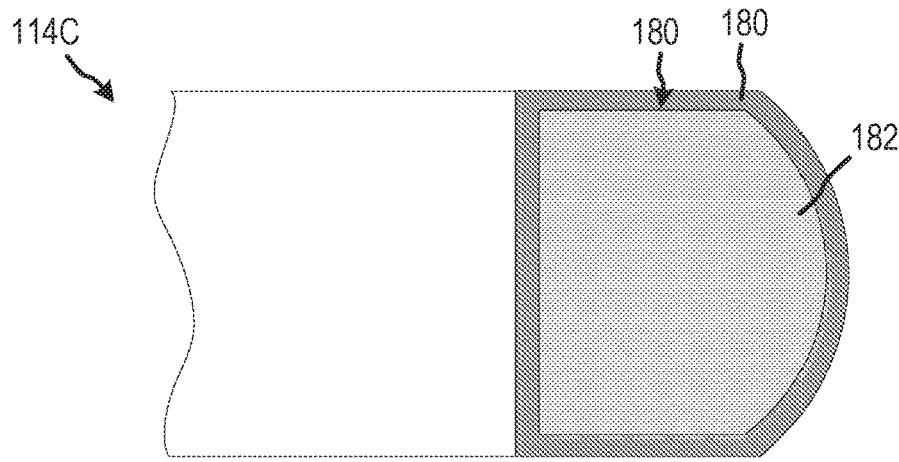
FIG. 17 is a top view of the access portion depicted in FIG. 15.

Additionally or alternatively, the access portion 114 includes an aperture and a self-sealing membrane arranged within the aperture (an example depicted in FIGS. 15-17). A material that may be used as the self-sealing membrane is implantable grade silicon, other suitable polymeric materials, and/or the materials disclosed in U.S. Pat. No. 7,985,263 to Gore, which is incorporated herein by reference in its entirety.

In at least some embodiments, one or more materials used to construct the access portion 114 may be selected and/or formed in a manner to reduce and/or eliminate cellular ingress into the access portion 114. By selecting and/or forming materials in a manner to reduce and/or eliminate cellular ingress into the access portion 114, the sensor 112 and/or therapeutic agent may be more easily accessed and/or replaced than if cells grew into the access portion 114. That is, cells that would otherwise have grown from the subcutaneous tissue 106 into the access portion 114 will not have to be disrupted (e.g., cut, ablated, dissected, etc.) to access the sensor 112 via the access portion 114.

To reduce and/or eliminate cellular ingress into the access portion 114, the access portion 114 can be formed of an ePTFE material where void spaces of the ePTFE material are impregnated with a hydrogel material in a continuous band within the ePTFE material adjacent to and/or along the exterior surface of the access portion 114. Additionally or alternatively, the pore size of the material used to form the access portion 114 may average less than about 5 microns, preferably average less than about 1 micron, most preferably average less than about 0.5 microns, as measured by internodal distance or fibril length, or the permeability suitably adjusted with a hydrogel material. In embodiments, the pore size may be tailored and/or optimized for a particular size analyte. For example, analytes above a threshold molecular size may be excluded and analytes below the threshold molecular weight may permeate the barrier portion 108A. In one example, the threshold molecular weight may be 250 kilodaltons (kDa). In another example, the threshold molecular weight may be 200 kDa. In even another example, the threshold molecular weight may be 100 kDa. In even another example, the threshold molecular weight may be 50 kDa. In even another example, the threshold molecular weight may be 25 kDa.

Other suitable materials for constructing the access portion 114 include, but are not limited to, metallic, ceramic, glassy, elastomeric, or other polymeric materials, either alone or in combination. Examples of metallic materials include, but are not limited to, tantalum, cobalt-chrome alloys, titanium and its alloys, stainless steel, or gold, either alone or in combination. Examples of ceramic materials include, but are not limited to, alum inas, silicas, zirconias, calcium sulfates, calcium carbonates, calcium phosphates (including hydroxyapatite and beta-tricalcium phosphate), borosilicate glasses, elemental carbon, ALCAP (a ceramic comprising aluminum, calcium, and phosphorous oxides), and bioglasses, either alone or in combination. Examples of elastomeric materials include, but are not limited to silicone, polyurethanes, fluoropolymer rubbers (e.g. Viton), poly(ethylene-co-propylene), and polybutadiene and its copolymers (e.g. Buna-N), either alone or in combination. Examples of polymeric materials include, but are not limited to polytetrafluoroethylene, polyethylene, polypropylene, polystyrene, poly(tetrafluoroethylene-co-perfluoropropylene), polyesters, such as, poly(ethylene terephthalate), polycarbonates, poly(methyl methyacrylate), and polyamides, either alone or in combination. The primary structural requirement of these materials for use in the access portion 114 is that they have the strength, biocompatibility, and longevity to function permanently or for a long term (i.e. at least about three weeks) in a recipient.

As set forth above, the sensor 112 may sense one or more analytes of interstitial fluid that permeated the barrier portion 108. In at least some embodiments, the sensor 112 transmits the data (e.g., signal values, raw data, operational information and parameters, and/or the like) corresponding to the one or more sensed analytes to a processor 116 for processing the data and/or a medical device (not shown) that is either implanted in the subject or external to the subject. In at least one embodiment, the processor 116 may determine concentrations of one or more of the sensed analytes for the subject. Based on the concentrations, the processor 116 may determine whether the concentrations are normal or abnormal. Further, the processor 116 may also provide a notification to a medical professional to provide therapy to the subject and/or the type of therapy to be provided based on abnormal concentration levels.

In at least some embodiments, the data may be transmitted via a wireless communication link and/or via a wired communication link (not shown) (e.g., an electrical and/or optical link). Examples of a wireless communication link include, but are not limited to, a short-range radio link, such as Bluetooth, Bluetooth Low Energy, IEEE 802.11, near-field communication (NFC), WiFi, active or passive RFID, a proprietary wireless protocol, and/or the like. In either embodiment, the wired communication link may be formed from a biocompatible material, such as polyethylene, silicone, or the like.

In at least some embodiments, the materials used to construct the barrier portion 108 may be inherently electromagnetically opaque. Those materials that are not inherently electromagnetically opaque can be modified to be electromagnetically opaque by impregnation of the material with barium, for example. Other suitable methods for rendering a material electromagnetically opaque known to those skilled in the art may also be used. The electromagnetically opacity of materials used to construct the barrier portion 108 is mainly used to facilitate surgical placement of the apparatus or to locate the apparatus in a recipient following implantation.

Due to the barrier portion 108 being constructed from materials that are electromagnetically opaque, the sensor 112 may be unable to transmit data corresponding to the sensed one or more analytes wirelessly from the cavity 110 to a device external to the barrier portion 108. To facilitate sampling of the cavity 110, a microneedle 118 may sample interstitial fluid included in the cavity 110. The microneedle 118 may pierce the surface 104 of the subject's skin and the barrier portion 108 of the implantable access chamber 102 and extract a sample of interstitial fluid. Once the microneedle 118 extracts the interstitial fluid, the interstitial fluid may be sent to a fluid analyzer 120, via a fluid pathway 121, to be analyzed. In at least some embodiments, the fluid analyzer 120 may be coupled to the processor 116 via a connection 122 for further analysis. Additionally or alternatively, the fluid analyzer 120 may transmit data corresponding to the analyzed fluid to the processor 116 via a non-wired connection.

Figure 2:
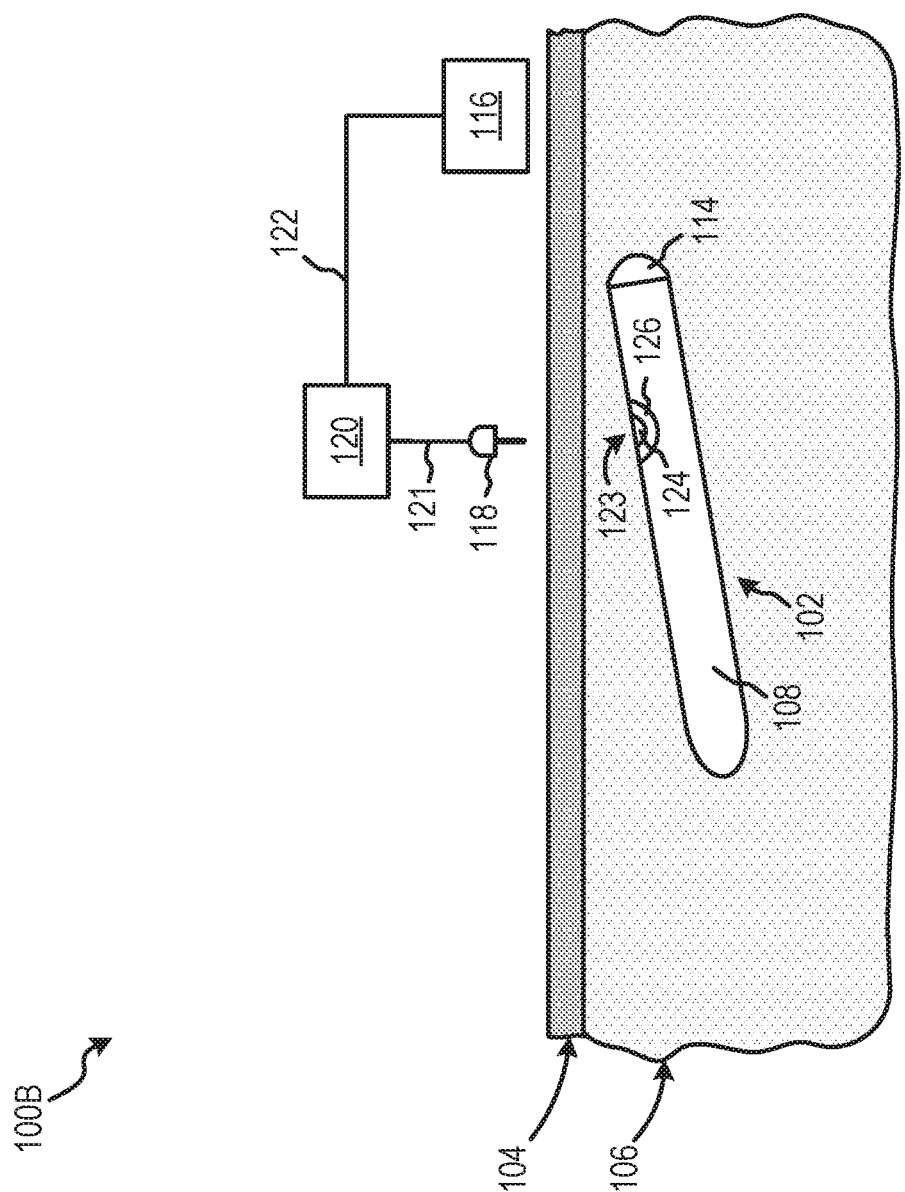
FIG. 2 is a side view of a system including an implantable access chamber according to another embodiment of the present disclosure.

To facilitate sampling one or more analytes in the cavity 110 by the microneedle 118, the implantable access chamber 102 may include a sampling site 123, as shown in FIG. 2. FIG. 2 is a side view of a system 100B including an implantable access chamber 102 according to another embodiment of the present disclosure. In at least one embodiment, the sampling site 123 includes a membrane 124. The membrane 124 may be comprised of a material that is easier to penetrate than the barrier portion 108. Additionally or alternatively, the membrane 124 may be comprised of a material that is self-sealing. As such, once the microneedle 118 samples the cavity 110 and is extracted from the membrane 124, the hole produced by the microneedle 118 may seal. A material that may be used as the membrane 124 is implantable grade silicon, other suitable polymeric materials, and/or the material disclosed in U.S. Pat. No. 7,985,263 to Gore, which is incorporated herein by reference in its entirety.

In at least one embodiment, the membrane 124 may be surrounded by an annulus 126. The annulus 126 may include a molded tactile ridge that enables a user to determine the location of the sampling site 123 so the microneedle 118 can accurately piece the membrane 124. Additionally or alternatively, the annulus 126 may include an indicator that can be sensed by the microneedle 118 or another device to determine the location of the sampling site 123. For example, the annulus 126 may include ferromagnetic material that, in response to sensing the ferromagnetic material, a distance between the microneedle 118 and the annulus 126 can be determined by, for example, the processor 116. Additionally or alternatively, the ferromagnetic material may mate with a magnet located in the microneedle 118 to ensure alignment and a durable connection to the sampling site 123. It is appreciated the elements described above can likewise be used simply for removing or collecting interstitial fluid itself that aggregates within the cavity 110.

Figure 3:
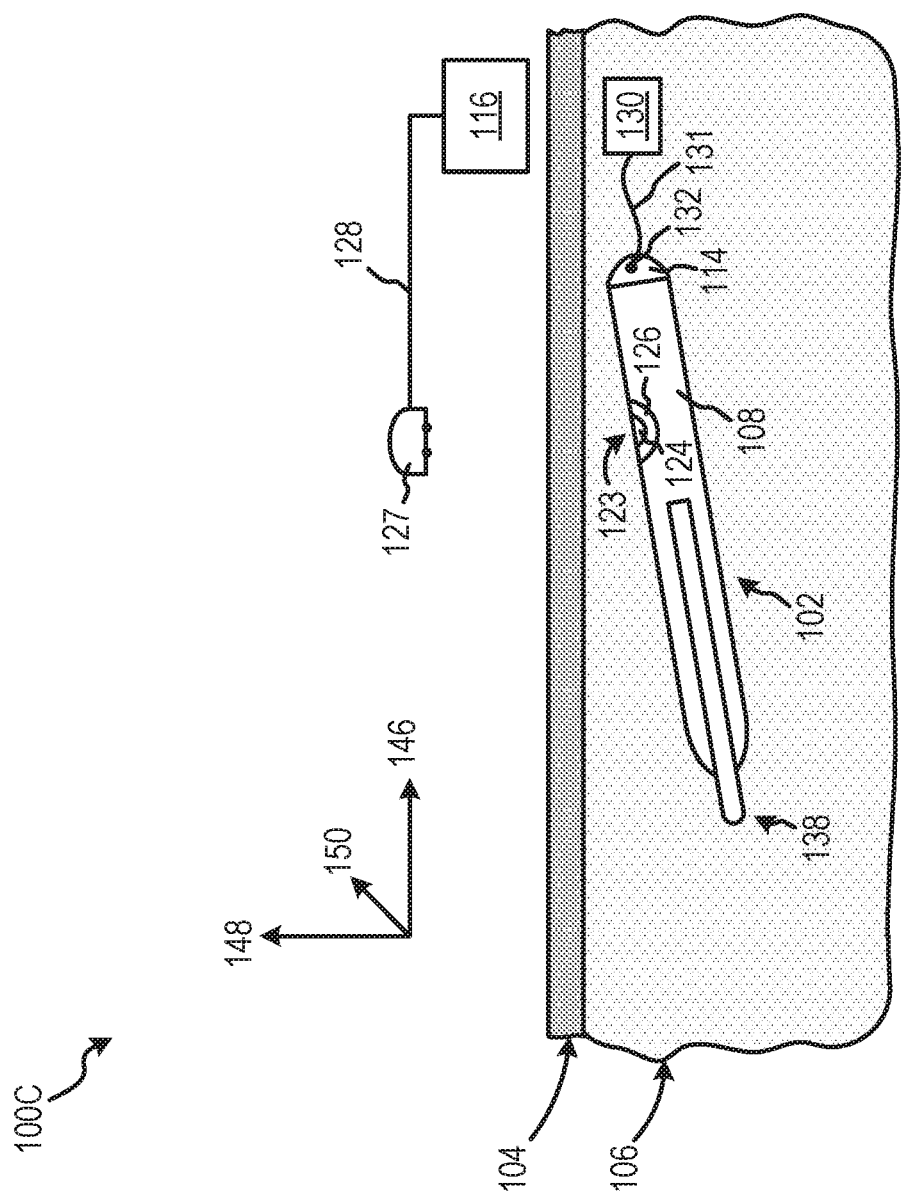
FIG. 3 is a side view of a system including an implantable access chamber according to even another embodiment of the present disclosure.

In another embodiment, to facilitate sampling one or more analytes in the cavity 110, the sampling site 123 may be comprised of a material through which electromagnetic waves can propagate, as shown in FIG. 3. FIG. 3 is a side view of a system 100C including an implantable access chamber 102 according to even another embodiment of the present disclosure. By being comprised of a material through which electromagnetic waves can propagate, the sensor 112 may transmit data to a receiving device 127 transdermally. In at least some embodiments, data may be transmitted by the sensor 112 to the receiving device 127 via OCT, TIR, PAS, scattering spectroscopy, and/or the like.

The electromagnetic waves transmitted by the sensor 112 may be received by a receiving device 127. After receiving the electromagnetic waves, the receiving device 127 can transmit the data of the electromagnetic waves to the processor 116 via an electrical connection 128 or a non-wired connection. To facilitate receipt of any electromagnetic waves by the receiving device 127, the sensing site 123 may include an annulus 126 surrounding the membrane 124. The annulus 126 may include an indicator that the receiving device 127 can sense to determine the location of the sampling site 123. For example, the annulus 126 may include ferromagnetic material that, in response to sensing the ferromagnetic material, the receiving device 127 can determine the distance between the device and the annulus 126.

The ferromagnetic material of the annulus 126 may also facilitate positioning of the implantable access chamber 102. In at least one example, the receiving device 127 may include a magnet that attracts the ferromagnetic material included in the annulus 126. The attraction between the magnet and the ferromagnetic material of the annulus 126 may facilitate an advantageous positioning of the implantable access chamber 102 and the sampling site 123 for reception of electromagnetic waves from the sensor 112 by the receiving device 127.

In some embodiments, data may also be transmitted from the sensor 112 to a second device 130 via a connection 131. In one example, the device 130 may be located transdermally. In another example, the device 130 may be located external to the surface 104 of the subject's skin. The device 130 may be a medical device that monitors one or more characteristics of a subject and/or deliveries therapy to the subject. The access portion 114 may further include a sealing member 132 for sealing the access portion 114 around the connection 131 to prevent entry of any materials, cells, or bodily fluid constituents into the cavity 110 that could interfere with or alter the readings of the sensor 112. In at least one embodiment, the sealing member 132 is a suture disc, sleeve, or tab. Additionally or alternatively, the access portion 114 may be comprised of a self-sealing membrane that seals around the edges of the connection 131.

As illustrated in FIGS. 5 and 6, the implantable access chamber 102 may include a sampling reservoir 134 having walls 136 that extend into the cavity 110. In at least some embodiments, the sampling reservoir may be accessible via the sampling site 123. The sampling reservoir 134 may be in fluid communication with the cavity 110. In some embodiments, however, the walls 136 of the sampling reservoir 134 may be more occlusive than the barrier portion 108. As such, fluid that flows into the sampling reservoir 134 may be filtered by the walls 136 and therefore a subset of the fluid in the cavity 110.

Figure 4:
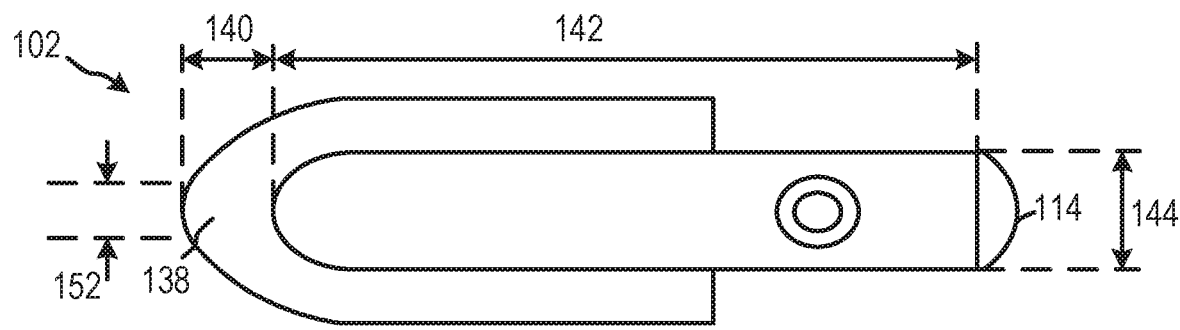
FIG. 4 is a top view of the implantable access chamber depicted in FIG. 3.

The implantable access chamber 102 may include a stabilizing flange 138 that extends from the barrier portion 108, as shown in FIGS. 3-5. The stabilizing flange 138 may be a ridge that extends from the barrier portion 108 and partially around the perimeter of the barrier portion 108. The stabilizing flange 138 may help anchor the implantable access chamber 102 within the subcutaneous tissue 106. To do so, the stabilizing flange 138 may be comprised of a material that encourages cellular ingrowth into the stabilizing flange 138. Exemplary materials are discussed below in relation to FIG. 10.

The stabilizing flange 138 may extend a distance 140 from the barrier portion 108 that is a percentage of the length 142 and/or a percentage of the width 144 of the implantable access chamber 102. For example, the stabilizing flange 138 may extend between 10%-30% the length 142 of the implantable access chamber 102 from the barrier portion 108. As another example, the stabilizing flange 138 may extend between 10%-100% the width 144 of the implantable access chamber 102 from the barrier portion 108. Additionally or alternatively, because the length 142 of the implantable access chamber 102 is likely greater than its width 144, the implantable access chamber 102 may be more likely to rotate about an x-axis 146 than rotating about a y-axis 148 or z-axis 150. To counter rotations about the x-axis 146, the width 152 of the stabilizing flange 138 may be greater than its height 154, as shown in FIGS. 4 and 5.

Figure 7:
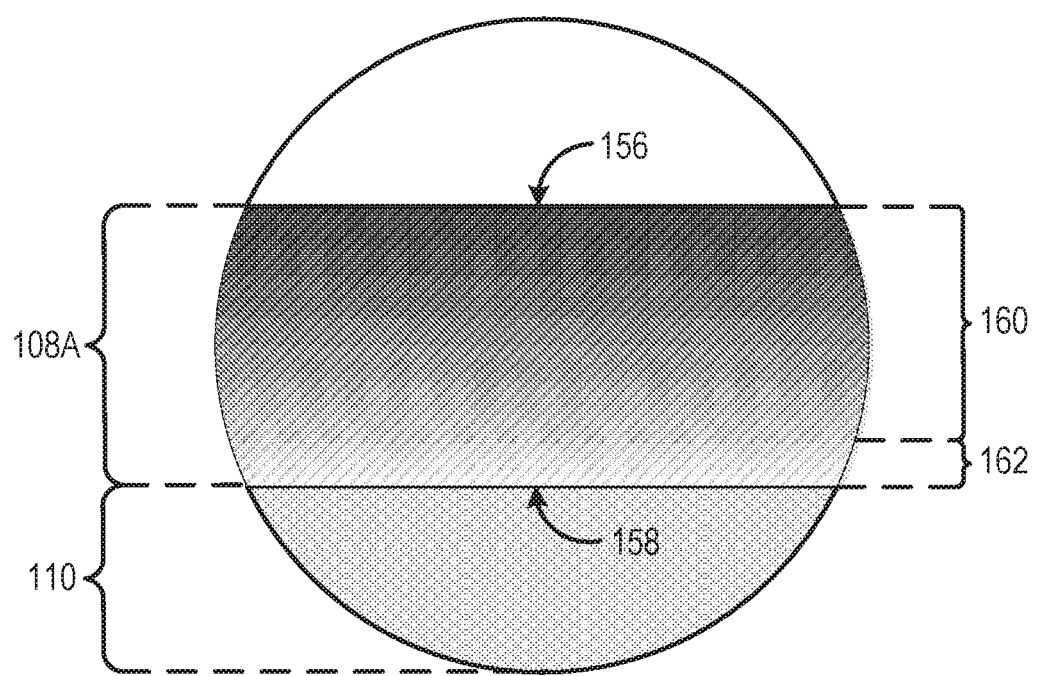
FIG. 7 is an enlarged view of the portion included in circle A of FIG. 5 according to an embodiment of the present disclosure.
Figure 8:
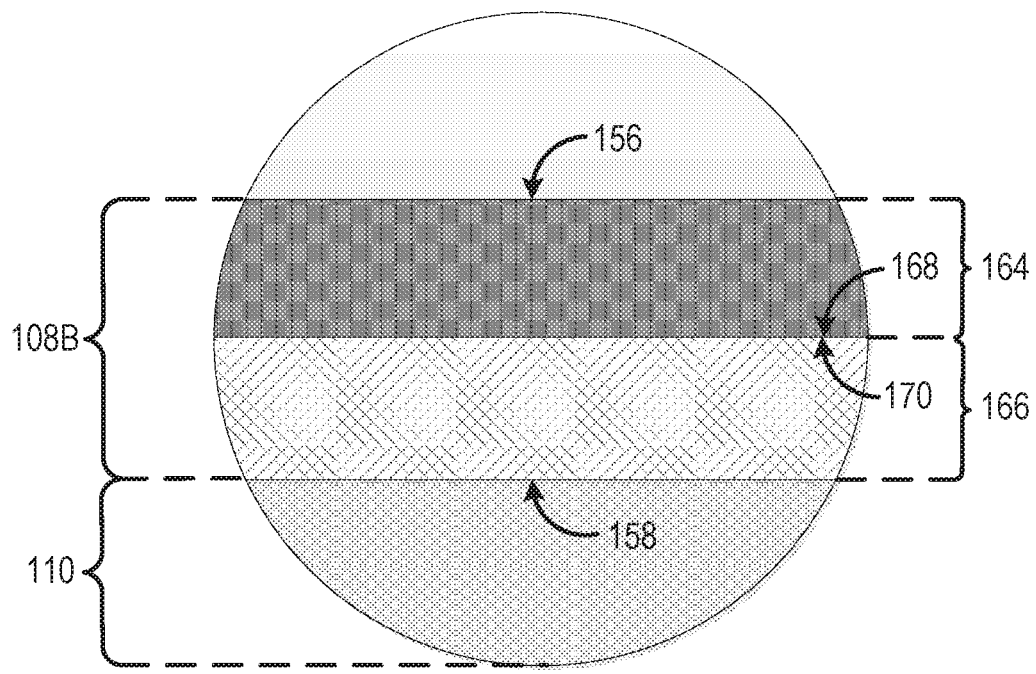
FIG. 8 is an enlarged view of the portion included in circle A of FIG. 5 according to another embodiment of the present disclosure.
Figure 9:
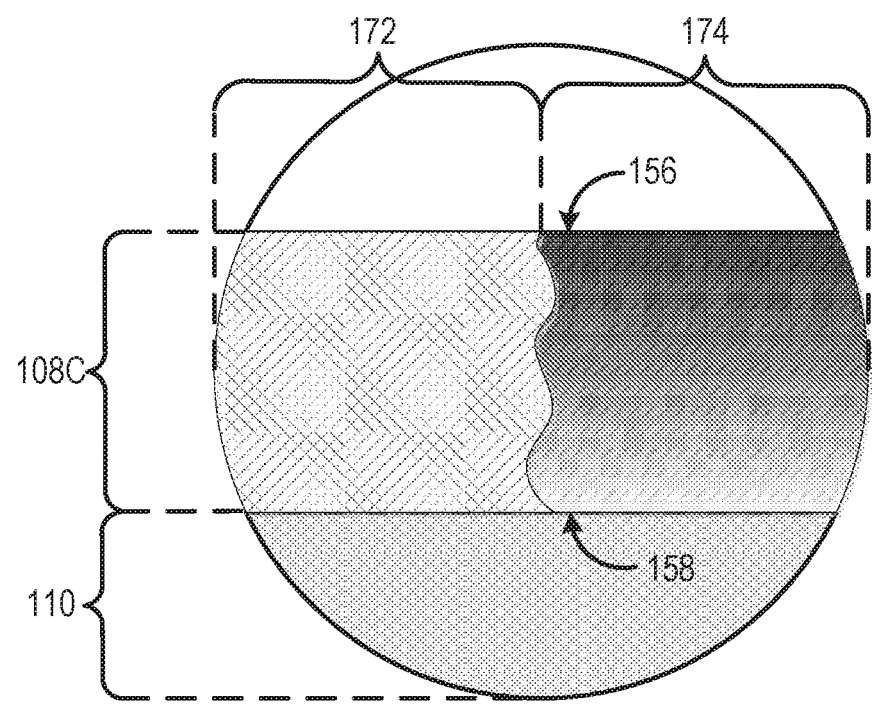
FIG. 9 is an enlarged view of the portion included in circle A of FIG. 5 according to even another embodiment of the present disclosure.

FIGS. 7-9 are enlarged views of the portion included in circle A of FIG. 5 according to different embodiments of the present disclosure. FIG. 7 depicts a cross-section of the implantable access chamber 102 illustrating the composition of the barrier portion 108A according to one embodiment of the present disclosure. FIG. 8 depicts a cross-section of the implantable access chamber 102 illustrating the composition of the barrier portion 108B according to another embodiment of the present disclosure. FIG. 9 depicts a cross-section of the implantable access chamber 102 illustrating the composition of the barrier portion 108C according to even another embodiment of the present disclosure.

Referring to FIG. 7, the barrier portion 108A extends from an exterior surface 156 of the barrier portion 108A to an interior surface 158 of the barrier portion 108A. In at least some embodiments, the material of the barrier portion 108A may be a monolithic structure that is substantially consistent from the exterior surface 156 to the interior surface 158. The barrier portion 108A may be comprised of a microporous polymeric material (e.g., ePTFE or a similar microporous material, such as ePE, electrospun biopolymers, or various microporous hydrogels). Due to the barrier portion 108A being comprised of a microporous material, a tortuous pathway may extend from the exterior surface 156 to the interior surface 158. Alternatively, the material of the barrier portion 108A may vary across the thickness of the barrier portion 108A. In these embodiments, the permeability of the polymeric material can be varied continuously across the thickness of the barrier portion 108A.

Due either to the tortuous pathway of the monolithic structure or the variable permeability of the barrier portion 108A, the barrier portion 108A may include a cell permeable zone 160 extending from the exterior surface 156 of the barrier portion 108A through to a cell exclusion zone 162 adjacent to the interior surface 158 of the cavity 110.) The cell permeable zone 160 may be sufficiently porous for vascular capillaries to form therein. The cell exclusion zone 162, on the other hand, may be impervious to cellular ingrowth. A cell exclusion zone 162 in the barrier portion 108A prevents invasive cells from entering the cavity 110 and contacting, adhering to, fouling, ingrowing, overgrowing, or otherwise interfering with a therapeutic agent and/or sensor contained within the cavity 110. To exclude invading host cells from growing through to the interior surface 158 of the barrier portion 108A, the pore size of the cell exclusion zone 162 may average less than about 5 microns, preferably average less than about 1 micron, most preferably average less than about 0.5 microns, as measured by internodal distance or fibril length, or the permeability suitably adjusted with a hydrogel material. In embodiments, the pore size may be tailored and optimized for a particular size analyte. For example, analytes above a threshold molecular size may be excluded and analytes below the threshold molecular size may permeate the barrier portion 108A. In one example, the threshold molecular weight may be 250 kilodaltons (kDa). In another example, the threshold molecular weight may be 200 kDa. In even another example, the threshold molecular weight may be 100 kDa. In even another example, the threshold molecular weight may be 50 kDa. In even another example, the threshold molecular weight may be 25 kDa.

While the cell permeable zone 160 is depicted as extending the majority of the thickness of the barrier portion 108A, this is only for illustrative purposes. In other embodiments, the majority of the thickness of the barrier portion 108A may be comprised of a cell exclusion zone 162 including, for example, the entire thickness of the barrier portion 108A may be comprised of a cell exclusion zone 162.

Referring to FIG. 8, the barrier portion 108B extends from an exterior surface 156 of the barrier portion 108B to an interior surface 158 of the barrier portion 108B. In at least some embodiments, the material of the barrier portion 108B may be comprised of a cohesive layer including a first layer 164 and a second layer 166. In embodiments, the first layer 164 forms the interior surface 158 defining the cavity 110 and an outer surface 168 opposite the interior surface 158. The second layer 166 is arranged as a second layer, wherein the second layer forms the exterior surface 156 configured to directly interact with the subcutaneous tissue 106 and an inner surface 170 opposite the exterior surface 156, wherein the inner surface 170 is arranged on the outer surface 168 of the first layer 164.

In at least one embodiment, the first layer 164 and/or the second layer 166 may be comprised of one or more microporous polymeric materials (e.g., ePTFE). Due to the first layer 164 being comprised of a microporous material, a tortuous pathway may extend from the exterior surface 156 to the inner surface 170. Additionally or alternatively, a sharp variance of characteristics between the first layer 164 and the second layer 166 may exist. Due either to the tortuous pathway of the first layer 164 or the sharp variance of characteristics between the first layer 164 and the second layer 166, the first layer 164 may be a cell permeable zone extending from the exterior surface 156 through to the inner surface 170 Moreover, the second layer 166 may be a cell exclusion zone extending from the outer surface 168 to the interior surface 158 of the cavity 110. The second layer 166 in the barrier portion 108A prevents invasive cells from entering the cavity 110 and contacting, adhering to, fouling, ingrowing, overgrowing, or otherwise interfering with a therapeutic agent and/or sensor contained within the cavity 110.

The first layer 164 and/or the second layer 166 may each be comprised of an ePTFE material having different porosities. In at least one embodiment, the second layer 166 is a layer of ePTFE material that is a very thin, very strong non-woven web composed substantially of fibrils in which there are essentially no nodes. This second layer 166 may have an average pore size ranging between about 0.05 and about 5 microns, as measured by internodal distance or fibril length. The preferred pore size of the second layer 166 is about 0.4 microns in its laminated, or finished, form. The thickness of the second layer 166 in its finished form is between about 1 micron and about 25.4 microns. One method of making the second layer 166 utilizes a portion of a method taught by U.S. Pat. No. 5,476,589 to Bacino, which is incorporated herein by reference in its entirety.

In the Bacino method, after the appropriate PTFE starting materials are chosen and prepared as a coagulated dispersion of fine powder PTFE, the coagulated dispersion powders are lubricated with a hydrocarbon extrusion aid, preferably as odorless mineral spirit such as Isopar K (made by Exxon. Corp.). The lubricated powder is compressed into cylinders and extruded in a ram extruder to form tapes. Two or more layers of tape can be stacked together and compressed between two rolls. The tape or tapes are compressed between rolls to an appropriate thickness, e.g. 5 to 40 mils, or so. The wet tape is stretched transversely to 1.5 to 5 times its original width. The extrusion aid is driven off with heat. The dried tape is then expanded, or stretched, longitudinally between banks of rolls in a space heated to a temperature that is below the polymer melting point of 327.degree. C. The longitudinal expansion is such that the ratio of speed of the second bank of rolls to the first bank is 10-100 to 1, preferably 35 to 1. The longitudinal expansion is repeated at a 1-1.5 to 1 ratio. Next, the tape, after the longitudinal expansion, is expanded transversely at a temperature that is less than 327 degrees C. to at least 1.5 times and preferably to 6 to 15 times the input width of the original extrudate while restraining the membrane from longitudinal contraction. While still under constraint the membrane is preferably heated to above the polymer melting point of 327 degrees C. and then cooled.

The first layer 164 containing the cell permeable zone is an ePTFE material made in accordance with the teachings of U.S. Pat. Nos. 3,953,566 and 4,187,390, both issued to Gore, each of which is incorporated herein by reference. The first layer 164 has an average pore size greater than about 3.0 microns, preferably greater than about 5.0 microns, as measured by fibril length. The thickness of the material ranges from about 10 microns to about 1000 microns, preferably about 40-60 microns.

Lamination of these two layers 164, 166 may be performed by repeating some of the steps of the above-referenced Bacino method. To perform the lamination, both above-described ePTFE materials are held together and expanded longitudinally between banks of rolls in a space heated to a temperature that is below the polymer melting point of 327 degrees C. The longitudinal expansion is such that the ratio of speed of the second bank of rolls to the first bank is 10-100 to 1, preferably 35 to 1, for the material produced by the Bacino method. The longitudinal expansion is repeated at a 1-1.5 to 1 ratio, between the second and third set of rolls where the material of the '566 patent is joined with the material from the Bacino method.

Next, the laminate, after the longitudinal expansion, is expanded transversely at a temperature that is less than 327 degrees C. to at least 1.5 times and preferably to 6 to 15 times the input width of the original laminates while restraining the laminate from longitudinal and transverse contraction. While still under constraint the laminate is preferably heated to above the polymer melting point of 327 degrees C. and then cooled.

While the first layer 164 and the second layer 166 each comprise approximately half of the thickness of the barrier portion 108B, this is only for illustrative purposes. In other embodiments, the majority of the thickness of the barrier portion 108A may be comprised of the first layer 164 or the majority of the thickness of the barrier portion 108A may be comprised of the second layer 166.

To make a tubular form with two planar sheets of laminate, the sheets of laminate are first placed together with their respective first layer 164 and second layer 166 on top of one another. The laminates are then placed in a die having the desired pattern of raised tracks. A thermally and chemically stable core is placed between the layers of laminate within the perimeter of the tubular form outlined by the elevated tracks in the die. Once in the die, the laminates and the core are heated to between about 310 degrees C. and about 380 degrees C. for about 1-10 minutes at a pressure sufficient to densify the ePTFE material and attach the planar sheets of laminate together where the heated tracks contact the sheets of laminate. The tube, core, and attached planar material are allowed to cool to room temperature and then removed from the die. The core is released from the interior of the tubular form by injecting water between the core and wall of the tube with a hypodermic syringe, for example. The planar material attached to the apparatus after its construction can be left attached, trimmed, or removed. Planar material left attached to the apparatus helps to hold the apparatus in the proper shape. The planar material also provides a surgeon with a means of handling the apparatus and a means of attaching an apparatus securely to an implantation site in a recipient.

In some embodiments, the above recited manufacturing method may additionally or alternatively be used to fabricate the stabilizing flange 138. Micropores may also be drilled into the stabilizing flange 138 to facilitate cellular ingress into the stabilizing flange 138.

Another way to form the barrier portion 108B in a tubular shape is by wrapping a material made in accordance with the teachings of U.S. Pat. No. 5,476,589 to Bacino on a mandrel followed by another wrap of a polymeric material. Bacino is incorporated herein by reference in its entirety. Longitudinal and helical orientations of the wrapped film may be used. This construction is then heated from about 320 degrees C. to about 380 degrees C. for about 5-10 minutes to bond the respective materials to themselves and to each other. The overlap of one layer of material with the next layer can range from less than about 10% to about 50%. In many applications, the overlap is preferably about 10%. It is understood that wraps and laminates of these materials can have no overlap between layers, however. In such an embodiment, the edge of each successive wrap of material abuts the edge of the previous wrap of material.

For some selectively permeable polymeric materials suitable for use as the barrier portions 108A, 108B, the molecular weight cutoff, or sieving property, of the barrier portion 108A may begin at the cell exclusion zone 162 and/or the second layer 166. As a result, certain solutes and/or cells do not enter and pass through the barrier portions 108A, 108B from one side to the other. In at least one embodiment, the material of the cell exclusion zone 162 and/or the second layer 166 may not prevent cells from growing next to or on the cell exclusion zone 162 and/or the second layer 166. For example, subcutaneous tissue 106, including vascular endothelial cells, grow to contact, but not penetrate, the cell exclusion zone 162 and/or the second layer 166. The vascular endothelial cells can combine to form capillaries thereon. Such capillary formation or neovascularization permits fluid and solute flux between tissues of a recipient and the contents of the cavity 110.

In another embodiment, the selective permeability of a polymeric material suitable for use as the cell exclusion zone 162 and/or the second layer 166 varies by impregnating the void spaces of the polymeric material with a hydrogel material. Hydrogel material can be impregnated in substantially all of the void spaces of a polymeric material or in only a portion of the void spaces. For example, by impregnating a polymeric material with a hydrogel material in a continuous band within the material adjacent to and/or along the interior surface 158 and/or at the outer surface 168 of a polymeric material, the selective permeability of the material is varied sharply from the exterior surface 156 to the interior surface 158 of the material to an inner cross-sectional area of the material. The amount and composition of hydrogel material impregnated in a polymeric material depends in large part on the particular polymeric material used to construct the barrier portions 108A, 108B, the degree of permeability required for a given application, and the biocompatibility of the hydrogel material. Examples of suitable hydrogel materials for use in the present invention include, but are not limited to, a polyvinyl alcohol (PVA) such as the one produced by W.L. Gore & Associates, hydrophilic lubricious coating (HLC), which may be cured by temperature, HYPAN®, BioA, Structural Hydrogel (Hymedix International, Inc., Dayton, N.J.), non-fibrogenic alginate, as taught by Dorian in PCT/US93/05461, which is incorporated herein by reference, agarose, alginic acid, carrageenan, collagen, gelatin, polyvinyl alcohol, poly(2-hydroxyethyl methacrylate, poly(N-vinyl-2-pyrrolidone), or gellan gum, either alone or in combination. HYPAN®. Structural Hydrogel is preferred. The total thickness of a barrier portions 108A, 108B comprised of an ePTFE/hydrogel composite may range from about 2 microns to about 1000 microns.

Additionally or alternatively, the permeability of the microporous polymeric material can be varied sharply across the thickness of the barrier portions 108A, 108B with an additional layer of polymeric material and a further layer of hydrogel material. An advantage of this embodiment is the additional protection provided an implant recipient against contamination with cells from a failed cell implantable access chamber 102. In addition, this configuration will provide a strong cell and humoral immune-isolation barrier.

Additionally or alternatively, various cell types can grow into the cell permeable zone 160 and/or the first layer 164 of a polymeric material of the barrier portions 108A, 108B. The predominant cell type that grows into a particular polymeric material depends primarily on the implantation site, the composition and permeability of the barrier portions 108A, 108B, and any biological factors, such as cytokines and/or cell adhesion molecules, for example, that may be incorporated in the material of the barrier portions 108A, 108B or introduced through the cavity 110. Suitable biological factors for use in the implantable access chamber 102, but are not limited to, protein and peptide cytokines, such as VEGF, platelet derived endothelial cell growth factor (PD-ECGF), fibroblast growth factor (FGF), peptides with the amino acid sequence gly-his-lys or their palindromes, with or without salt-bridged copper (II), polysaccharides with angiogenic activity, such as heparin, angiogenesis stimulating lipids, such as oleic acid, or metals, such as copper, either alone or in combination. Alternatively, anti-inflammatory therapeutic agents, such as dexamethasone can be employed to mitigate inflammation and the ensuing cellular response.

In at least one embodiment, vascular endothelium is the predominant cell type that grows into the cell permeable zone 160 and/or the first layer 164. Vascularization of the cell permeable zone 160 and/or the first layer 164 by a well-established population of vascular endothelial cells in the form of a capillary network is encouraged to occur as a result of neovascularization of the cell permeable zone 160 and/or the first layer 164 from subcutaneous tissue 106 into and across the thickness of the cell permeable zone 160 and/or the first layer 164. In at least one embodiment, the neovascularization may through the cell permeable zone 160 and/or the first layer 164 may approach the cell exclusion zone 162 and/or the second layer 166, respectively, but not across the cell exclusion zone 162 and/or the second layer 166.

Though vascularization of the cell permeable zone 160 and/or the first layer 164 can occur without the addition of biological factors, angiogenic factors, such as those mentioned above, they can be used to enhance vascularization of the cell permeable zone 160 and/or the first layer 164. In addition, angiogenesis can be stimulated by conditions, such as hypoxia. This neovascularization of the cell permeable zone 160 and/or the first layer 164 may improve mass transport of therapeutic drugs or biochemical substances between the cavity 110 and subcutaneous tissue 106, thereby enhancing the quantity and rate of transport of therapeutic drugs or biochemical substances between the cavity 110 and subcutaneous tissue 106. In higher animals, nearly all cells are within about 100 microns of a capillary. Therefore, to achieve maximum exchange of materials between the cavity 110 and subcutaneous tissue 106, it is preferred that the maximum distance ingrown capillaries should be from the cavity 110 is less than about 100 microns, more preferably less than about 50 microns, and most preferably less than about 25 microns. Accordingly, the cell exclusion zone 162 and/or the second layer 166 should be less than about 100 microns, preferably less than about 50 microns, and most preferably less than about 25 microns, in thickness. In addition to permitting vascularization of the polymeric material, the permeability of the polymeric material is chosen to selectively permit passage of biochemical substances, including therapeutic drugs, having molecular weights up to about 5,000,000 MW across the thickness of the barrier portions 108A, 108B. Since a chronic inflammatory response to the implantable access chamber 102 has not been observed in experimental animals, it is believed that vascularization of the cell permeable zone 160 and/or the first layer 164 proceeds along with the wound healing process of the implantation site.

In at least one embodiment, vascularization of the cell permeable zone 160 and/or the first layer 164 could also be accomplished by culturing a population of autologous, or immunogenically neutralized, vascular endothelial cells on the exterior surface 156 that would grow and assemble into capillaries connected to the subject's circulatory system. A vascular subendothelial matrix substrate, such as collagen, fibronectin, laminin, or derivatives thereof, applied to the exterior surface 156 followed by seeding the exterior surface 156 with cells should allow the cells to grow and differentiate into capillaries thereon. A commercially available subendothelial cell matrix that may be suitable for this purpose in experimental rats is a preparation known under the tradename "MATRIGEL." (Collaborative Laboratories, Inc.) Alternatively, a suitable subendothelial matrix preparation may be obtainable from the vasculature of the implant subject.

Vascularization and other tissue ingrowth of the cell permeable zone 160 and/or the first layer 164 may assist in anchoring the implantable access chamber 102 in the implantation site. This may be an important feature, as migration of conventionally implanted therapeutic devices is often a concern. For a tubular implantable access chamber 102, anchorage of the implantable access chamber 102 in an implantation site with ingrown host tissues assists in maintaining the shape of the implantable access chamber 102. Maintaining the shape of the implantable access chamber 102 may facilitate easy placement, replacement, and proper functioning of a therapeutic agent and/or sensor contained in the implantable access chamber 102.

As set forth above, FIG. 9 depicts a cross-section of the implantable access chamber 102 illustrating the composition of the barrier portion 108C according to even another embodiment of the present disclosure. The barrier portion 108C may include a first portion 172 and a second portion 174 arranged adjacent to one another. In at least one embodiment, respective outer surfaces of the first and second portions 172, 174 collectively define the exterior surface 156, which is configured to interact with the subcutaneous tissue 106. Moreover, respective inners surfaces of the first and second portions 172, 174 collectively define the inner surface 158, which forms the cavity 110. In at least one embodiment, the first portion 172 may have some or all of the same characteristics as the second layer 166 and the second portion may have some or all of the same characteristics as the barrier portion 108A.

Figure 10:
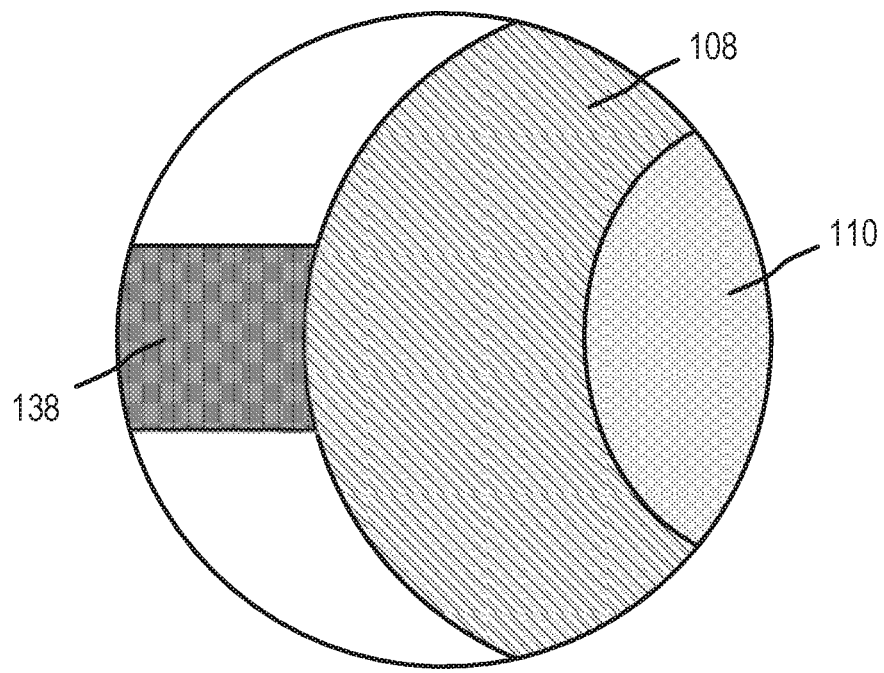
FIG. 10 is an enlarged view of the portion included in Circle B of FIG. 5 according to an embodiment of the present disclosure.

FIG. 10 is an enlarged view of the portion included in Circle B of FIG. 5 according to an embodiment of the present disclosure. In at least some embodiments, the stabilizing flange 138 may have some or all of the same characteristics as the first layer 164. For example, the stabilizing flange 138 may permit cellular growth into and through the stabilizing flange 138 to increase the likelihood the implantable access chamber 102 maintains it position.

Figure 11:
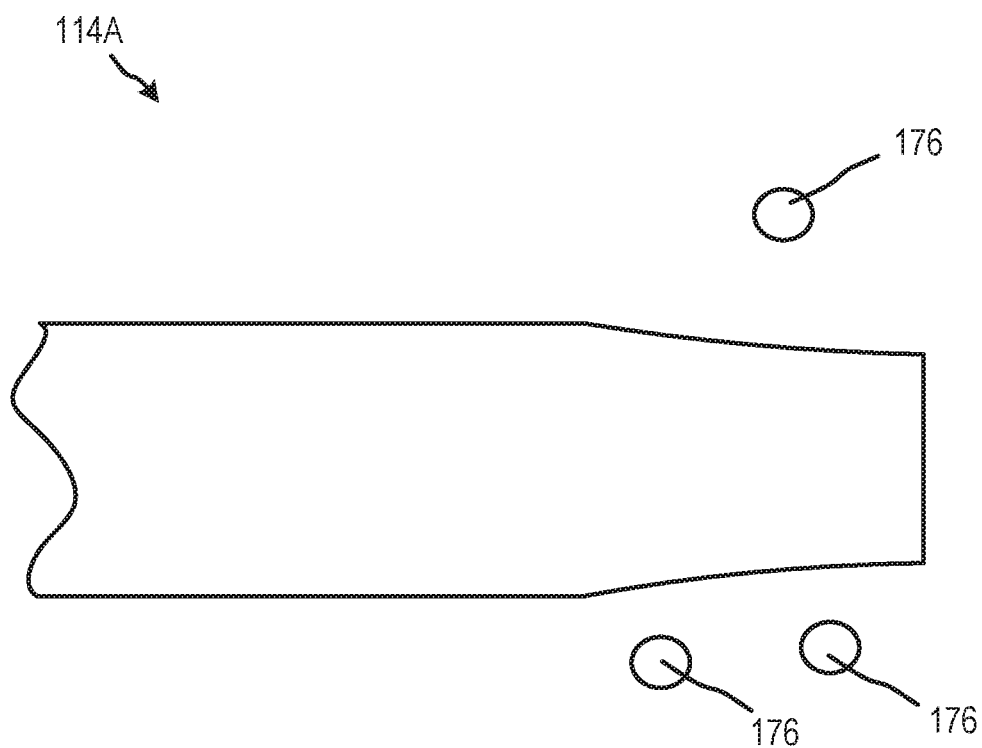
FIGS. 11-12 are enlarged side views of the access portion of the implantable access chamber according to an embodiment of the present disclosure.
Figure 12:
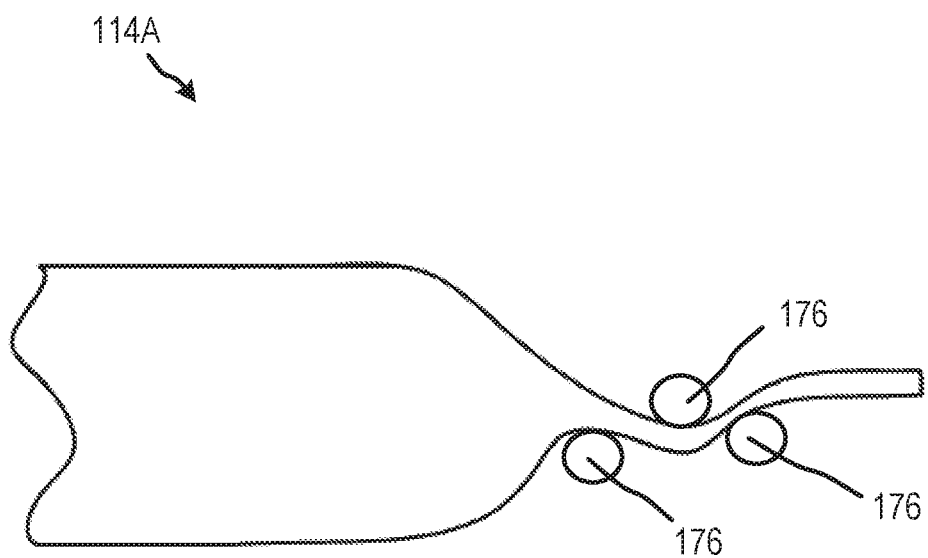

FIGS. 11-12 are enlarged side views of the access portion 114A of the implantable access chamber 102 according to an embodiment of the present disclosure. In particular, FIG. 11 depicts the access portion 114A in an open configuration during which a sensor can be inserted into the cavity 110 via the access portion 114A and FIG. 12 depicts the access portion 114A in a sealed configuration using clamps 176. As illustrated, the clamps 176 may have an intermittent arrangement that aid in creating a hermetical or a fluid-tight seal for the access portion 114A.

Figure 13:
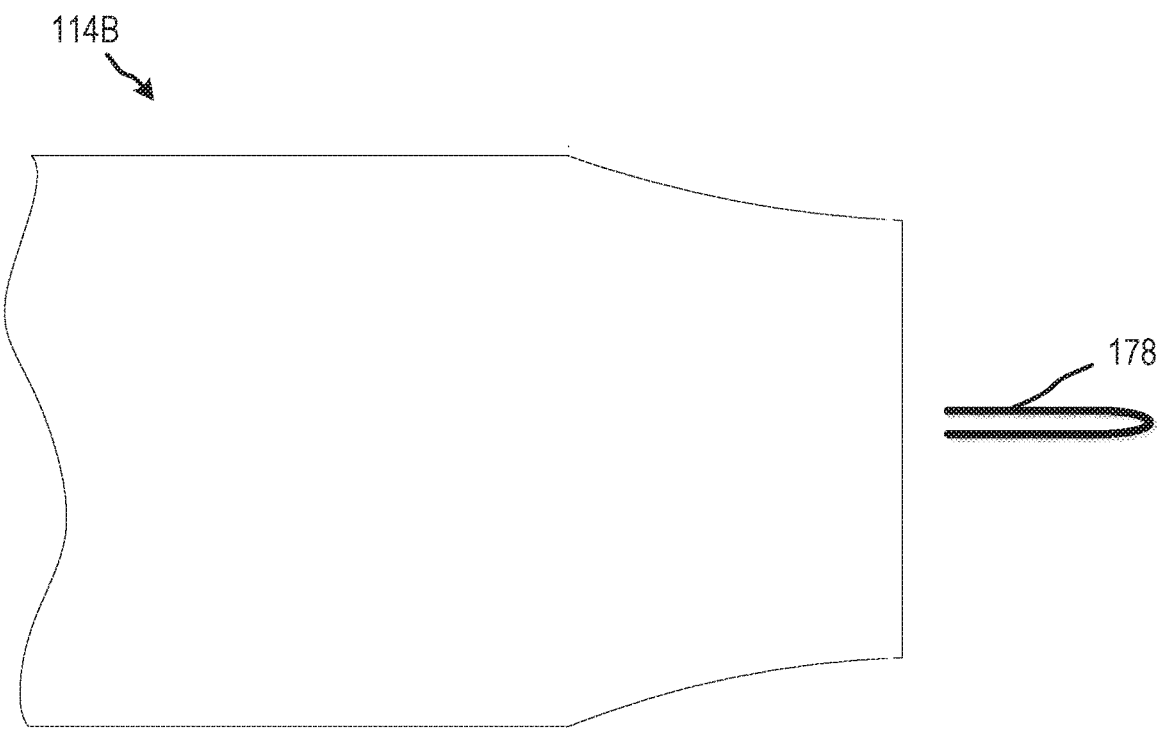
FIGS. 13-14 are enlarged side views of the access portion of the implantable access chamber according to another embodiment of the present disclosure.
Figure 14:
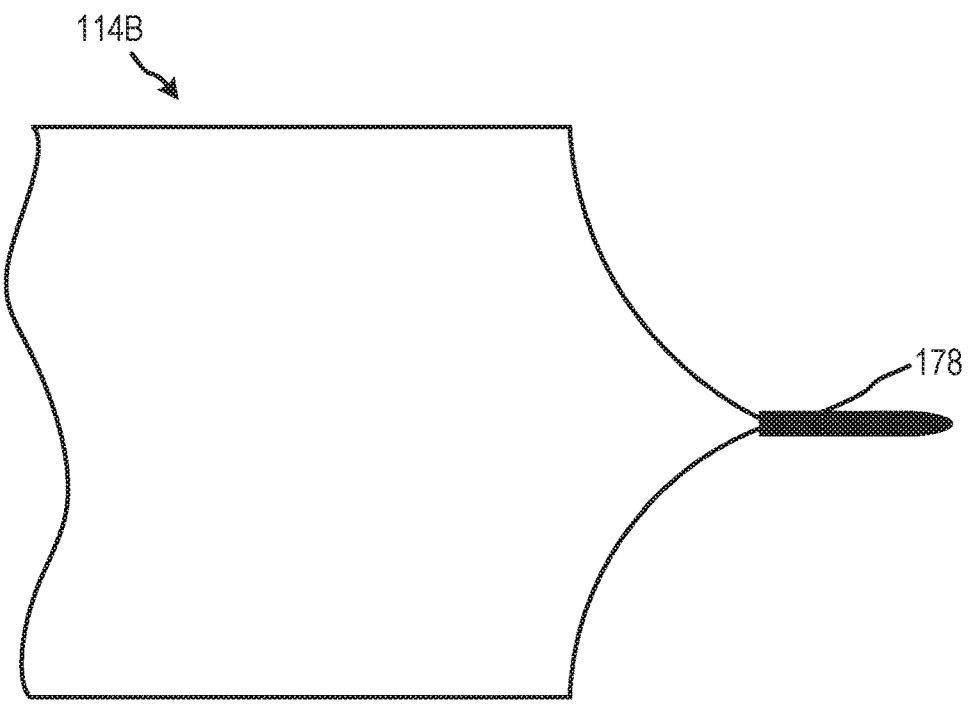

FIGS. 13-14 are enlarged side views of the access portion 114B of the implantable access chamber 102 according to another embodiment of the present disclosure. In particular, FIG. 13 depicts the access portion 114B in an open configuration during which a sensor 112 and/or therapeutic agent can be inserted into the cavity 110 via the access portion 114B and FIG. 14 depicts the access portion 114B in a sealed configuration using a pinch clip 178. As illustrated, the pinch clip 178 may have cinch down the open ends of the access portion 114B thereby creating a hermetical or a fluid-tight seal for the access portion 114B.

FIG. 15 is an enlarged side view of the access portion 114C of the implantable access chamber 102 according to even another embodiment of the present disclosure. FIG. 16 is a cross section of the access portion 114C depicted in FIG. 15 and FIG. 17 is a top view of the access portion 114C depicted in FIG. 15.

The access portion 114C comprises an annulus 180 forming an aperture 181. In at least one embodiment, a membrane 182 is arranged within the aperture 181. The annulus 180 may have the same or similar characteristics as the annulus 126 described above. For example, to locate the membrane 182, the annulus 180 may include an indicator that the receiving device 127 can sense to determine the location of the membrane 182. As another example, the annulus 180 may include ferromagnetic material that, in response to sensing the ferromagnetic material, a device (e.g., the receiving device 127) can determine the distance between the device and the annulus 180. Additionally or alternatively, the ferromagnetic material of the annulus 180 may also facilitate positioning of the membrane 182. In at least one example, a device (e.g., the receiving device 127) may include a magnet that attracts the ferromagnetic material included in the annulus 180. The attraction between the magnet and the ferromagnetic material of the annulus 180 may facilitate an advantageous positioning of the membrane 182 so the sensor 112 may be retrieved from the cavity 110 and/or the sensor 112 may be arranged within the cavity 110 when the implantable access chamber 102 is arranged in the subcutaneous tissue 106. Due to the advantageous positioning of the membrane 182, a therapeutic agent can be injected into the cavity 110 when the implantable access chamber 102 is arranged in the subcutaneous tissue 106.

Additionally or alternatively, the annulus 180 may be a molded tactile ridge that includes a molded housing 184 securing the annulus 180 to the cavity 110, which a user and/or medical professional can feel through the skin to determine the location of the access portion. In some embodiments, electronics and/or a power supply may be connected to the molded housing 184.

In at least some embodiments, the membrane 182 is self-sealing. Because the membrane 182 may be self-sealing, the sensor 112 and/or a therapeutic agent may be inserted through the membrane 182 into the cavity 110 and after the sensor 112 passes through the membrane 182 and/or the an injector used to insert the therapeutic agent into the cavity 110 is withdrawn, the membrane 182 may substantially close by itself thereby creating a hermetical or a fluid-tight seal for the access portion 114C. A material that may be used as the membrane 182 is disclosed in U.S. Pat. No. 7,985,263 to Gore, which is incorporated herein by reference in its entirety.

FIG. 18 is a flow diagram of a method 200 of treatment using an implantable access chamber according to an embodiment of the present disclosure. In at least one embodiment, the implantable access chamber can have some or all of the same characteristics as the implantable access chamber 102 described above.

The method 200 comprises locating the implantable access chamber 102 implanted within the subcutaneous tissue, the implantable access chamber 102 comprising a sensor being in fluid communication with the interstitial fluid (block 202). In at least one embodiment, the subcutaneous tissue can have some or all of the same characteristics as the subcutaneous tissue 106 described above. Additionally or alternatively, the sensor can have some or all of the same characteristics as the sensor 112 described above.

To locate the implantable access chamber 102, the implantable access chamber 102 may include a sampling site (similar to the sampling site 123 described above) that includes an annulus (similar to the annulus 126 described above). The annulus 126 may include a molded tactile ridge that enables a user to determine the location of the annulus 126 by feeling for the annulus 126 under the subject's skin. Additionally or alternatively, the annulus 126 may include a ferromagnetic material that, in response to sensing the ferromagnetic material, a device (e.g., the receiving device 127) can determine the distance between the device and the annulus. Based on a determined distance between a device and the annulus, the location of the implantable access chamber 102 may be determined.

The method 200 further comprises receiving, from the sensor 112, sensor data corresponding to at least one analyte of the interstitial fluid (block 204). In embodiments, the sensor data may be the same or similar to the sensor data described above and the data receiving the sensor data may be the same or similar to the receiving device 127 described above. Additionally or alternatively, the at least one analyte may be the same or similar to the analytes described above. The sensor data may be received transdermally via an electromagnetic wave (e.g., a wave in the visible spectrum) emitted from the sensor. Additionally or alternatively, the sensor may change luminescence in response to one or more analytes and the changes in luminescence may be detected by the device.

The method 200 further comprises analyzing the sensor data to determine one or more characteristics of the subject based on the sensed data (block 206). In at least one embodiment, a processor that is the same or similar to the processor 116 described above may analyze the sensor data. For example, the processor may analyze the sensed data to determine concentrations of one or more of the sensed analytes; and, based on the sensed analytes the processor may provide a notification for a medical professional to provide a therapeutic agent in response to the concentrations. In some embodiments, the method 200 comprises providing the therapeutic agent to the subject (block 208). The therapeutic agent may be provided internal to the implantable access chamber 102 and may be the same or similar to the therapeutic agents described above. Alternatively, the sensed data may be used to suggest another therapeutic remedy.

FIG. 19 is a flow diagram of a method 300 of accessing a cavity of an implantable access chamber according to an embodiment of the present disclosure. During the discussion of FIG. 19, reference will be made to FIGS. 20A-20G, which depict cross-sectional views of accessing a cavity 110 and inserting a sensor 112 into the cavity 110 according to an embodiment of the present disclosure. It is appreciated that this technique would be performed under some type of local anesthetic.

In at least one embodiment, the implantable access chamber can have some or all of the same characteristics as the implantable access chamber 102 described above. Additionally or alternatively, the cavity can have some or all of the same characteristics as the cavity 110 described above.

Figure 20A:
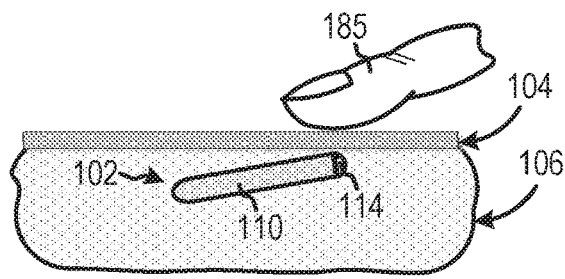
FIGS. 20A-20G depict cross-sectional views of accessing a cavity and inserting a sensor into the cavity according to an embodiment of the present disclosure.

The method 300 comprises locating the implantable access chamber 102 implanted within the subcutaneous tissue 106 (block 302). In at least one embodiment, the implantable access chamber 102 comprises a sensor 112 being in fluid communication with the interstitial fluid 106. To locate the implantable access chamber 102, the implantable access chamber 102 may include an access portion (similar to the access portion 114 described above) that includes an annulus (similar to the annulus 180 described above). The annulus 180 may include a molded tactile ridge that can be felt by a finger 185 under the subject's skin, as shown in FIG. 20A. Additionally or alternatively, the annulus 180 may include a ferromagnetic material that, in response to sensing the ferromagnetic material, a device (e.g., the receiving device 127) can determine the distance between the device and the annulus. Based on a determined distance between a device and the annulus, the location of the access portion may be determined.

Figure 20B:
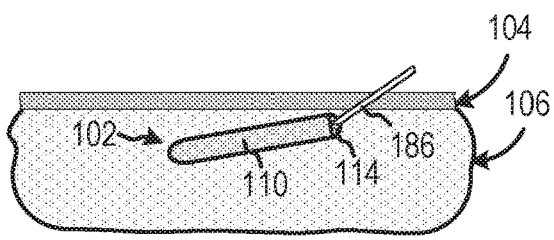
Figure 20C:
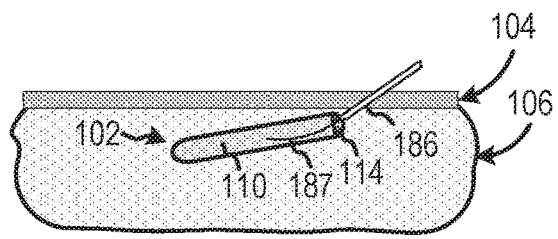
Figure 20D:
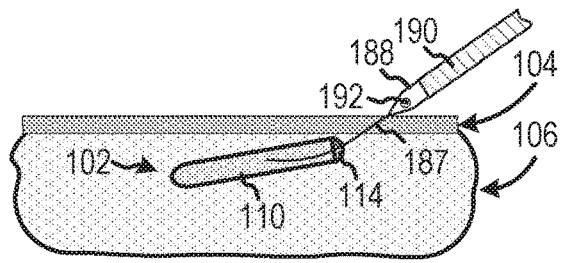
Figure 20E:
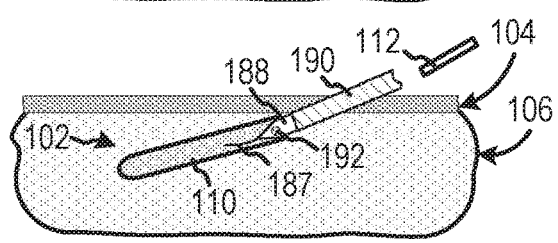

The method 300 further comprises inserting a needle 186 transdermally into the access site 114 of the implantable access chamber 102, as shown in FIG. 20B (block 304). A guidewire 187 may then be inserted through the needle 186 into the cavity 110 of the implantable access chamber 102 via the access portion 114 as shown in FIG. 20C (block 306). The needle 186 may then be removed (block 308) and a dilator 188 may then be placed over the guidewire 187 in order to dilate the access portion 114, as shown in FIGS. 20D and 20E (block 310). The dilator 188 may include an introducer sheath 190 surrounding the dilator 188 to facilitate positioning a sensor 112 in the implantable access chamber 102, as described below.

Figure 20F:
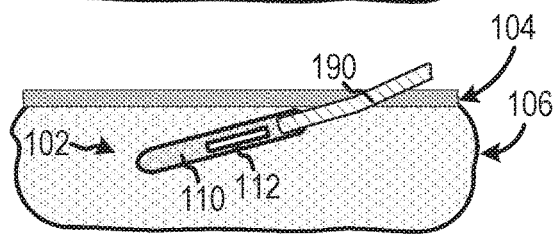

The method 300 may further comprise accessing the cavity 110 via the dilator 188 (block 312). In at least one embodiment, the dilator 188 includes an internal lumen 192 through which a sensor 112 can be placed in the cavity 110. Alternatively, the dilator 188 may be removed from the introducer sheath 190 (block 314) and the sensor 112 may be placed inside the cavity 110 via the introducer sheath 190, as shown in FIG. 20F (block 316). Additionally or alternatively, a sensor 112 located within the cavity 110 may be removed from the cavity 110 and/or a new or different type of sensor 112 may be inserted into the cavity 110 via the introducer sheath 190 and/or internal lumen 192. In at least some embodiments, the sensor 112 may be removed and/or inserted into the cavity 110 using a fluid stream. Additionally or alternatively, a therapeutic agent may be inserted into the cavity 110 via the internal lumen 192 of the dilator 188 (block 318). In at least one embodiment, the therapeutic agent may be the same or similar to the therapeutic agents described above.

Additionally or alternatively, a receiving device, similar to the receiving device 127, may be inserted into the cavity 110. Accordingly, the cavity 110 may be accessed via the internal lumen using an accessory device. The receiving device 127 may receive sensed data from a sensor 112 arranged within the cavity 110.

Figure 20G:
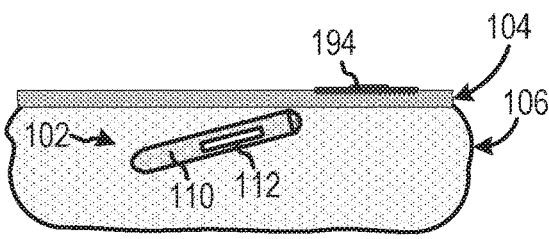

The introducer sheath 190 may then be withdrawn and the point on the surface 104 of the subject's skin where the dilator 188 was inserted may be sutured and/or covered by gauze 194, a Band-Aid, and/or the like, as shown in FIG. 20G.

In order to easily place the sensor 112 inside the cavity 110, a slippery, or lubricous, surface may be present on the exterior surface of the sensor 112. To do so, a hydrogel may be applied to the exterior surface of the sensor 112, which adds to the lubricous of the exterior surface of the sensor 112. Additionally or alternatively, a hydrogel may be applied to the surfaces of the cavity 110. Furthermore, selectively permeable polymeric materials are also lubricous, which, in embodiments, may be used to construct the cavity 110. Such a membrane impregnated with a hydrogel material or coated with a surfactant is more lubricous.

In addition to the importance of having lubricous surfaces between the surfaces of the cavity 110 and the sensor 112, it is also important to have sufficient clearance between these components if a fluid stream is used to place the sensor 112 in the cavity 110. To this end, it may be advantageous to construct the cavity 110 using a permeable microporous polymeric material because it is radially distensible. Suitable radially distensible materials can stretch slightly under pressure and return to their original dimensions when the pressure is released. Very close or direct contact between the surface of the cavity 110 the external surface of a sensor 112 along substantially the entire length of the sensor 112 can be achieved with this type of material.

To remove the sensor 112, a pressurized fluid stream may be provided into the cavity 110 via the access portion 114. A pressurized fluid stream is then established around the around and through the cavity 110 to entrain the sensor 112 in the fluid stream. Once entrained in the fluid stream, the sensor 112 is removed from the tube through one of the access portion 114 with the fluid stream. The fluid stream can either push or pull the sensor 112 out of the cavity 110. If desired, another sensor 112 can be placed in the cavity 110. In addition to ease of insertion and retrieval of a sensor 112 in the cavity 110, the method 300 may facilitate preserving subcutaneous tissue 106 surrounding the implantable access chamber 102.

Various embodiments include features and/or methods for avoid collapsing the cavity 110 during insertion or removal of the sensor 112. For example, maintaining internal positive pressure in a range of about 5-100 psi is usually adequate to prevent collapse of the cavity 110 during loading, unloading, and refilling of the cavity 110 with a sensor 112. In various applications, the thickness and nominal diameter of a microporous polymeric membrane will depend in large part on how much internal pressure a particular implantable access chamber 102 will tolerate.

After replacement of a sensor 112 and/or introduction of a therapeutic agent into the cavity 110, the access portion 114 may self-seal when the membrane of the access portion 114 is comprised of a self-sealing membrane, such as the membrane 182. Alternatively, the access portion 114 may be sealed using, for example, clamps (e.g., the clamps 176) and/or a pinch clip (e.g., the pinch clip 178).

In at least some embodiments, the subcutaneous tissue 106 proximal to the access portion 114 may be flushed upon placement and/or removal of a sensor 112 in the cavity 110 and/or injection of a therapeutic agent into the cavity 110. Antibiotics, saline, or a combination of any appropriate solution or drug may be infused through the internal lumen 192 and/or introducer sheath 190 and into the subcutaneous tissue 106 near the access portion 114.

Figure 21:
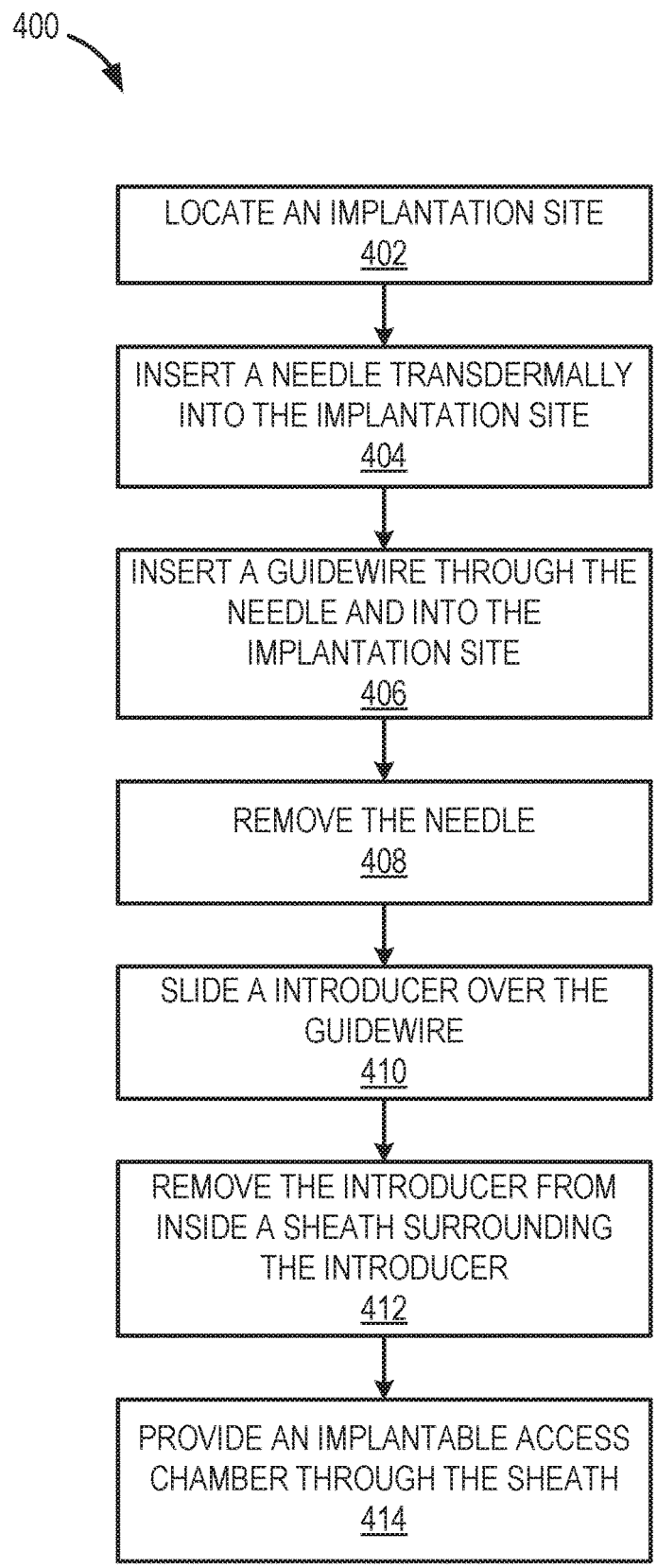
FIG. 21 is a flow diagram of a method of implanting an implantable access chamber according to an embodiment of the present disclosure.

FIG. 21 is a flow diagram of a method 400 of implanting an implantable access chamber according to an embodiment of the present disclosure. During the discussion of FIG. 21, reference will be made to FIGS. 22A-22G, which depict side views of implanting an implantable access chamber according to an embodiment of the present disclosure. In embodiments, the method 400 may be performed under a local anesthetic.

In at least one embodiment, the implantable access chamber can have some or all of the same characteristics as the implantable access chamber 102 described above. Additionally or alternatively, the cavity can have some or all of the same characteristics as the cavity 110 described above.

Figure 22A:
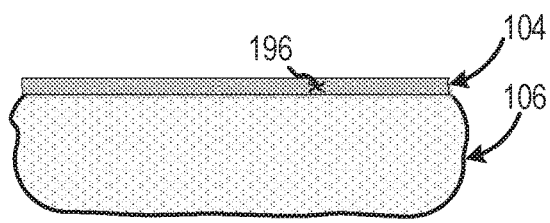
FIGS. 22A-22G depict side views of implanting an implantable access chamber according to an embodiment of the present disclosure.
Figure 22B:
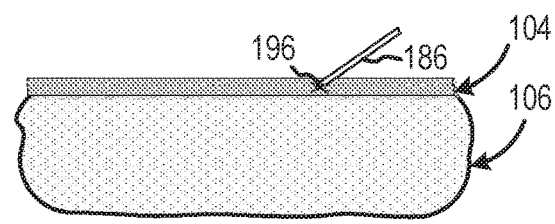

The method 400 comprises locating an implantation site 196, as shown in FIG. 22A (block 402). In at least one embodiment, the implantation site 196 may be a subject's subcutaneous tissue 106. Additionally or alternatively, the implantation site 196 may be other types of tissue, such as muscle, lymph, organ tissue, veins, ophthalmologic, arteries or the like, and used in animal tissue. The implantation site 196 may depend on the function of the implantable access chamber 102, e.g., sensing a specific type of analyte and/or delivering a specific type of therapeutic agent.

Figure 22C:
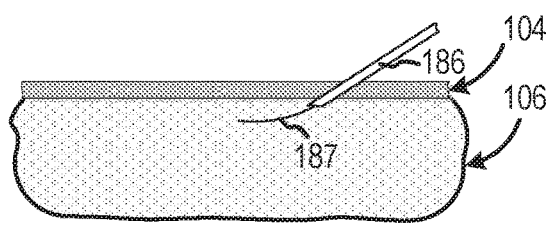
Figure 22D:
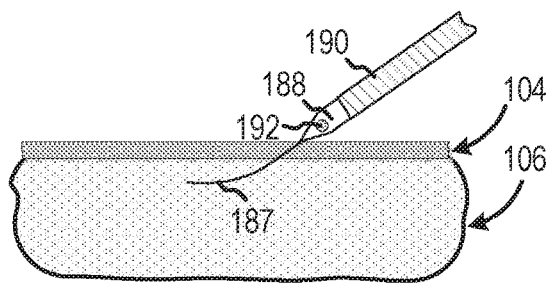
Figure 22E:
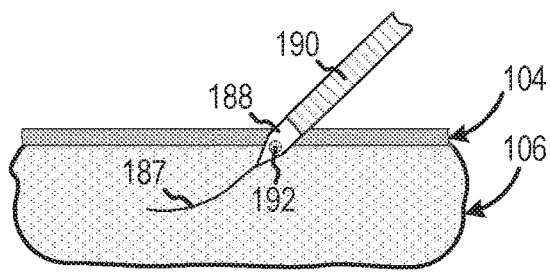
Figure 22F:
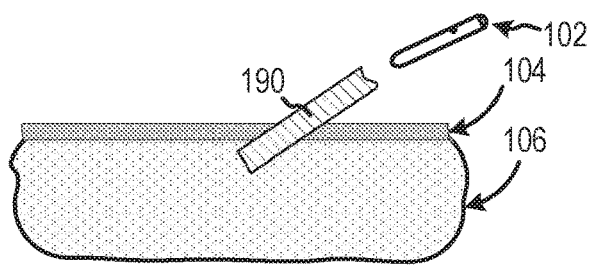
Figure 22G:
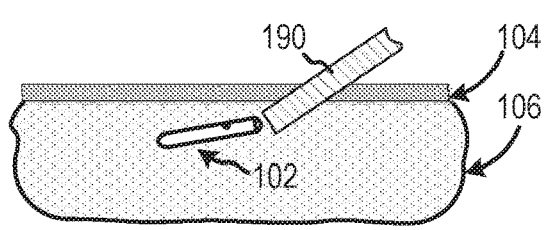

In at least one embodiment, the method 400 further comprises inserting a needle 186 transdermally into the implantation site 196, as shown in FIG. 20B (block 304). A guidewire 187 may then be inserted through the needle 186 into the implantation site 196, as shown in FIG. 22C (block 406). The needle 186 may then be removed (block 408) and a dilator 188 may be slid over the guidewire 187 (block 410). The guidewire 187 may facilitate positioning the dilator 188 into the implantation site 196 and the subcutaneous tissue 106 of a subject, as shown in FIGS. 22D and 22E. In at least one embodiment, the dilator 188 includes an internal lumen 192 through which an implantable access chamber 102 can be provided into the subcutaneous tissue 106. Alternatively, an introducer sheath 190 may surround the dilator 188 and the dilator 188 may be removed from the introducer sheath 190, as shown in the FIG. 22F (block 412).

The method 400 further comprises providing the implantable access chamber 102 into and through the introducer sheath 190 to arrange the implantable access chamber 102 in the subcutaneous tissue 106, as shown in FIG. 20G (block 414). In order to facilitate placing the implantable access chamber 102, a slippery, or lubricous, surface may be present on the exterior surface of the implantable access chamber 102. The implantable access chamber 102 may be comprised of ePTFE, which is lubricous. Additionally or alternatively, a hydrogel may be applied to the exterior surface of the implantable access chamber 102, which adds to the lubricous of the exterior surface. In addition, selectively permeable polymeric materials are also lubricous. Such a membrane impregnated with a hydrogel material or coated with a surfactant is more lubricous.

In at least some embodiments, the implantation site 196 and/or subcutaneous tissue 106 proximal to the implantation site 196 may be flushed upon implantation of the implantable access chamber 102. Antibiotics, saline, or a combination of any appropriate solution or drug may be applied to the implantation site 196 and/or infused through the internal lumen 192 and/or introducer sheath 190 and into the subcutaneous tissue 106 near the implantation site 196.

Figure 23:
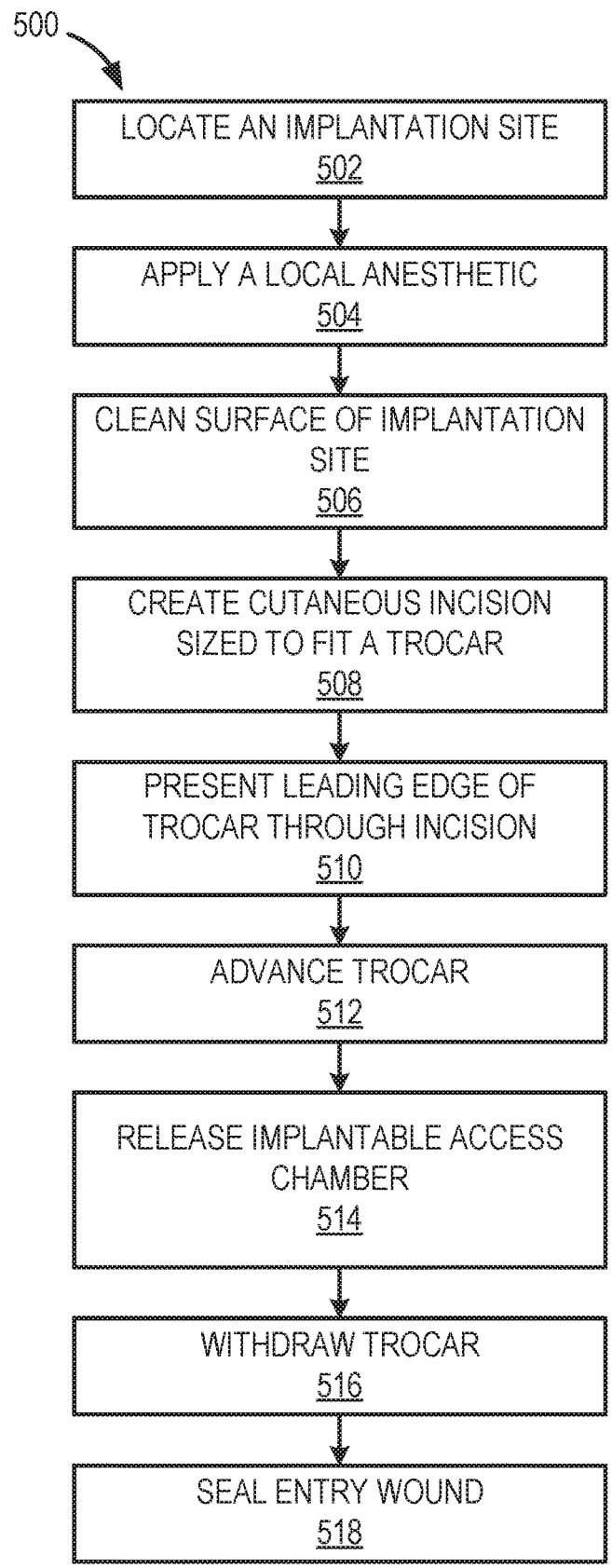
FIG. 23 is a flow diagram of a method of implanting an implantable access chamber according to another embodiment of the present disclosure.

FIG. 23 is a flow diagram of a method 500 of implanting an implantable access chamber according to another embodiment of the present disclosure. During the discussion of FIG. 23, reference will be made to FIGS. 24A-24H, which depict side views of implanting an implantable access chamber according to another embodiment of the present disclosure.

In at least one embodiment, the implantable access chamber can have some or all of the same characteristics as the implantable access chamber 102 described above. Additionally or alternatively, the cavity can have some or all of the same characteristics as the cavity 110 described above.

Figure 24A:
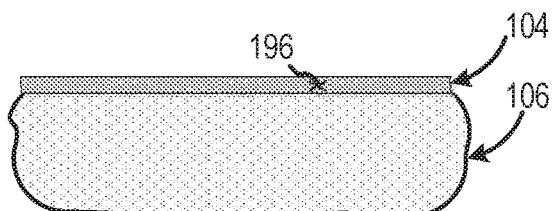
FIGS. 24A-24H depict side views of implanting an implantable access chamber according to another embodiment of the present disclosure.

The method 500 comprises locating an implantation site 196, as shown in FIG. 24A (block 502). In at least one embodiment, the implantation site 196 may be a subject's subcutaneous tissue 106. Additionally or alternatively, the implantation site 196 may be other types of tissue, such as muscle, lymph, organ tissue, veins, ophthalmologic, arteries or the like, and used in animal tissue. The implantation site 196 may depend on the function of the implantable access chamber 102, e.g., sensing a specific type of analyte and/or delivering a specific type of therapeutic agent.

Figure 24B:
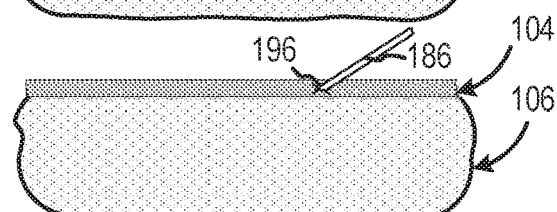
Figure 24C:
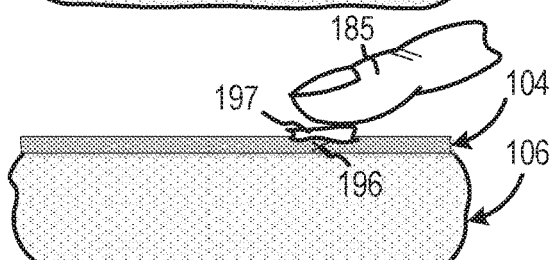
Figure 24D:
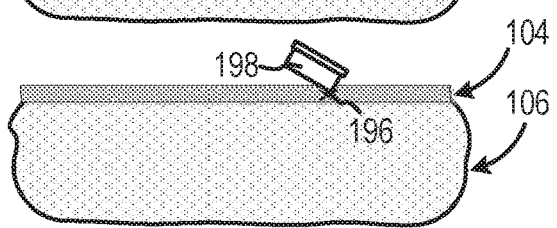
Figure 24E:
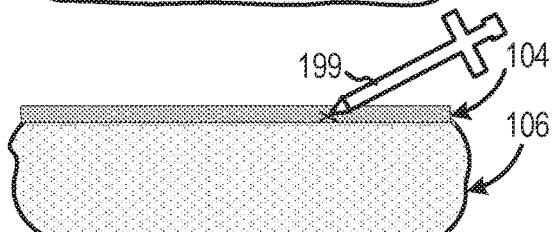
Figure 24F:
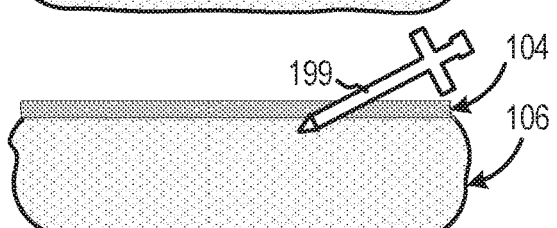
Figure 24G:
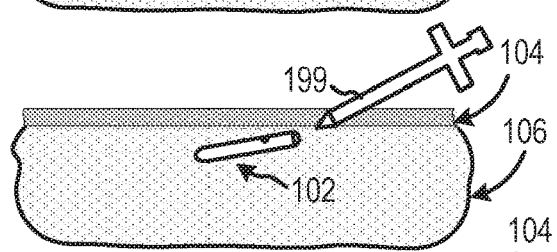

In at least one embodiment, the method 500 further comprises applying a local anesthetic to the implantation site 196 using, e.g., a needle 186, as shown in FIG. 24B (block 504). The method 500 may also comprise cleaning the surface of the implantation site 196 using, e.g., an alcohol wipe 197, as shown in FIG. 24C (block 506). The method 500 may further comprise creating a cutaneous incision sized to fit a trocar at the implantation site 196 using, e.g., a razor 198, as shown in FIG. 24D (block 508). The implantable access chamber 102 may be included in the trocar 199. The method may further comprise inserting the leading edge of a trocar 199 through the incision, as shown in FIG. 24E (block 510). The trocar 199 may then be advanced into the subcutaneous tissue 106 where the implantable access chamber 102 will be placed, as shown in FIG. 24F (block 512). The implantable access chamber 102 may then be released into the subcutaneous tissue 106, as shown in FIG. 24G (block 514).

Figure 24H:
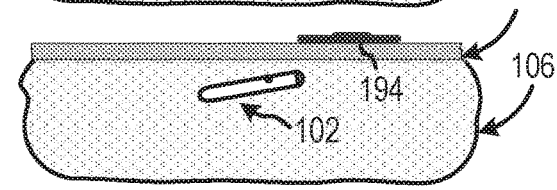

The trocar 199 may then be withdrawn (block 516) and the point on the surface 104 of the subject's skin where the trocar 199 was inserted may be sutured and/or covered by gauze 194, a Band-Aid, and/or the like, as shown in FIG. 24H (block 518).

In order to facilitate placing the implantable access chamber 102, a slippery, or lubricous, surface may be present on the exterior surface of the implantable access chamber 102. The implantable access chamber 102 may be comprised of ePTFE, which is lubricous. Additionally or alternatively, a hydrogel may be applied to the exterior surface of the implantable access chamber 102, which adds to the lubricous of the exterior surface. In addition, selectively permeable polymeric materials are also lubricous. Such a membrane impregnated with a hydrogel material or coated with a surfactant is more lubricous.

In at least some embodiments, the implantation site 196 and/or subcutaneous tissue 106 proximal to the implantation site 196 may be flushed upon implantation of the implantable access chamber 102. Antibiotics, saline, or a combination of any appropriate solution or drug may be applied to the implantation site 196 and/or infused through the trocar 199 and into the subcutaneous tissue 106 near the implantation site 196.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. An implantable access chamber configured to be inserted into tissue of a subject and for use with a sensor configured to sense at least one analyte of interstitial fluid of the subject, the implantable access chamber comprising:
    a barrier portion defining a cavity and being comprised of a material permeable to the interstitial fluid and occlusive to cells of the subject, the barrier portion being formed as a monolithic structure;
    a sensor within the cavity, wherein the cavity completely encapsulates the sensor, and the sensor is operable to sense the at least one analyte of the interstitial fluid in the cavity; and
    wherein the implantable access chamber further comprises an access portion secured to the barrier portion, the access portion operable to facilitate insertion and removal of the sensor within the cavity and to be self-sealing after the sensor is inserted and removed within the cavity.

2. The implantable access chamber of claim 1, the barrier portion comprising a sampling site for sampling the interstitial fluid contained therein.

3. The implantable access chamber of claim 2, wherein the cavity is accessible via the sampling site using electromagnetic energy.

4. The implantable access chamber of claim 2, the implantable access chamber further comprising a sampling reservoir arranged within the cavity and accessible via the sampling site, the sampling reservoir being configured to be in fluid communication with interstitial fluid that permeates the barrier portion.

5. The implantable access chamber of claim 4, the barrier portion being more occlusive than walls of the sampling reservoir.

6. The implantable access chamber of claim 1, the implantable access chamber further comprising a lead terminating in the cavity and exiting the cavity via an access portion of the implantable access chamber, the lead being configured to couple the sensor to another device.

7. The implantable access chamber of claim 1, the sensor being printed on a surface of the cavity.

8. The implantable access chamber of claim 1, the implantable access chamber further comprising a stabilizing flange extending from the barrier portion, the stabilizing flange being comprised of a material configured to encourage greater tissue ingrowth into the stabilizing flange than at least a portion of the barrier portion.

9. The implantable access chamber of claim 1, wherein at least a portion of the implantable access chamber is comprised of a ferromagnetic material.

10. The implantable access chamber of claim 1, wherein the barrier portion is comprised of a material occlusive to molecules that exceed a threshold molecular weight.

11. The implantable access chamber of claim 1, wherein the access portion comprises an annulus forming an aperture and a self-sealing member within the aperture.

12. The implantable access chamber of claim 1, the implantable access chamber further comprising a photoluminescent receptor arranged in the cavity.

13. The implantable access chamber of claim 1, the implantable access chamber further comprising a coating arranged on an outer surface of the barrier portion, wherein the coating is configured to reduce biochemical accumulation on the outer surface of the barrier portion.

14. The implantable access chamber of claim 13, wherein the coating is at least one of: solid polyurethane coating or one that includes heparin.

15. The implantable access chamber of claim 1, the implantable access chamber further comprising an active therapeutic agent.

16. The implantable access chamber of claim 15, the active therapeutic agent comprising at least one of: dexamethasone and vascular endothelial growth factor.

* * * * *